United States Patent
Seo et al.

(10) Patent No.: US 9,853,785 B2
(45) Date of Patent: Dec. 26, 2017

(54) METHOD OF RELAY NODE USING REFERENCE SIGNAL AND RELAY NODE USING THE METHOD

(71) Applicant: LG Electronics Inc., Seoul (KR)

(72) Inventors: Han Byul Seo, Anyang-si (KR); Dae Won Lee, Anyang-si (KR); Byoung Hoon Kim, Anyang-si (KR); Hak Seong Kim, Anyang-si (KR); Yu Jin Noh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/582,482

(22) Filed: Dec. 24, 2014

(65) Prior Publication Data

US 2015/0139138 A1    May 21, 2015

Related U.S. Application Data

(63) Continuation of application No. 13/391,193, filed as application No. PCT/KR2010/005466 on Aug. 18, 2010, now Pat. No. 8,942,322.

(30) Foreign Application Priority Data

Aug. 10, 2010    (KR) .......................... 10-2010-0076740

(51) Int. Cl.
*H04W 4/00* (2009.01)
*H04L 5/00* (2006.01)
(Continued)

(52) U.S. Cl.
CPC ............. *H04L 5/0048* (2013.01); *H04B 7/15* (2013.01); *H04B 7/15542* (2013.01);
(Continued)

(58) Field of Classification Search
CPC . H04L 5/0048; H04L 5/0091; H04L 27/2601; H04L 5/0007; H04L 5/0051;
(Continued)

(56) References Cited

U.S. PATENT DOCUMENTS

| | | | |
|---|---|---|---|
| 2006/0204009 A1* | 9/2006 | Li ........................... | H04J 13/00 380/255 |
| 2008/0232494 A1 | 9/2008 | Pan et al. | |

(Continued)

FOREIGN PATENT DOCUMENTS

| | | |
|---|---|---|
| CA | 2 715 010 A1 | 10/2009 |
| CN | 101478808 A | 7/2009 |
| EP | 2493092 A2 | 8/2012 |
| JP | 2011-501906 A | 1/2011 |
| WO | WO 2009/046318 A2 | 4/2009 |
| WO | WO 2009/056464 A1 | 5/2009 |
| WO | WO 2009/098960 A1 | 8/2009 |
| WO | WO 2009/126586 A2 | 10/2009 |

OTHER PUBLICATIONS

3GPP TS 25.211 V8.4.0, "Physical channels and mapping of transport channels onto physical channels (FDD) (Release 8)", Mar. 2009, Section 5.3.3.2 "Downlink phase reference", pp. 1-56.
(Continued)

*Primary Examiner* — Tanmay Shah
(74) *Attorney, Agent, or Firm* — Birch, Stewart, Kolasch & Birch, LLP

(57) ABSTRACT

A method for transmitting a control signal, performed by a wireless device. The method according to one embodiment includes allocating resource elements (REs) for a control channel; and transmitting the control signal through the Res. Each RE in the REs for the control channel is associated with one out of two antenna ports. The two antenna ports are included in a plurality of antenna ports used for transmitting demodulation reference signals (DM RS).

8 Claims, 19 Drawing Sheets

Related U.S. Application Data

(60) Provisional application No. 61/235,322, filed on Aug. 19, 2009, provisional application No. 61/254,744, filed on Oct. 25, 2009, provisional application No. 61/256,272, filed on Oct. 29, 2009, provisional application No. 61/307,409, filed on Feb. 23, 2010, provisional application No. 61/322,816, filed on Apr. 9, 2010, provisional application No. 61/322,908, filed on Apr. 11, 2010, provisional application No. 61/325,353, filed on Apr. 18, 2010, provisional application No. 61/334,582, filed on May 14, 2010, provisional application No. 61/357,513, filed on Jun. 22, 2010.

(51) Int. Cl.
| | | |
|---|---|---|
| *H04B 7/155* | (2006.01) | |
| *H04B 7/26* | (2006.01) | |
| *H04W 16/26* | (2009.01) | |
| *H04B 7/15* | (2006.01) | |
| *H04L 27/26* | (2006.01) | |
| *H04W 36/12* | (2009.01) | |
| *H04W 84/04* | (2009.01) | |

(52) U.S. Cl.
CPC ......... *H04B 7/2606* (2013.01); *H04L 5/0091* (2013.01); *H04L 27/2601* (2013.01); *H04W 16/26* (2013.01); *H04W 36/12* (2013.01); *H04L 5/0007* (2013.01); *H04L 5/0051* (2013.01); *H04W 84/047* (2013.01)

(58) Field of Classification Search
CPC .... H04B 7/15; H04B 7/2606; H04B 7/15542; H04W 36/12; H04W 16/26; H04W 84/047
USPC ......................................................... 370/329
See application file for complete search history.

(56) References Cited

U.S. PATENT DOCUMENTS

| | | | |
|---|---|---|---|
| 2009/0022110 A1* | 1/2009 | Muharemovic | H04L 1/1671 370/336 |
| 2009/0093222 A1 | 4/2009 | Sarkar | |
| 2009/0252077 A1 | 10/2009 | Khandekar et al. | |
| 2009/0279493 A1* | 11/2009 | Gaal | H04L 1/1861 370/329 |
| 2010/0067512 A1* | 3/2010 | Nam | H04B 7/068 370/342 |
| 2010/0118989 A1 | 5/2010 | Sayana et al. | |
| 2011/0149715 A1 | 6/2011 | Khan et al. | |
| 2011/0211510 A1* | 9/2011 | Kim | H04L 1/16 370/311 |
| 2011/0317657 A1 | 12/2011 | Chmiel et al. | |
| 2014/0098788 A1 | 4/2014 | Uemura et al. | |

OTHER PUBLICATIONS

NEC Group, "Control Structure for Relay Type 1 nodes", TSG-RAN WG1#57bis, R1-092965, Jun. 29-Jul. 3, 2009, 5 pages provided.

ZTE, "Considerations on Demodulation Reference Signal in Backhaul Downlink", TSG-RAN WG1 #58, R1-093204, Aug. 24-28, 2009, 6 pages provided.

ZTE, "Cooperation Scheme Considerations for Type II Relay", 3GPP TSG RAN1 #57, R1-091710, May 4-8, 2009, 4 pages provided.

Catt, "Demodulation RS design for LTE-A," 3GPP TSG RAN WG1 meeting #57, R1-091984 San Francisco, USA, May 4-8, 2009, 9 pages.

Nortel, "Discussion paper on the control channel and data channel optimization for relay link," TSG-RAN Working Group 1 Meeting #56bis, R1-091364, Seoul, Korea, Mar. 23-27, 2009, 9 pages.

\* cited by examiner

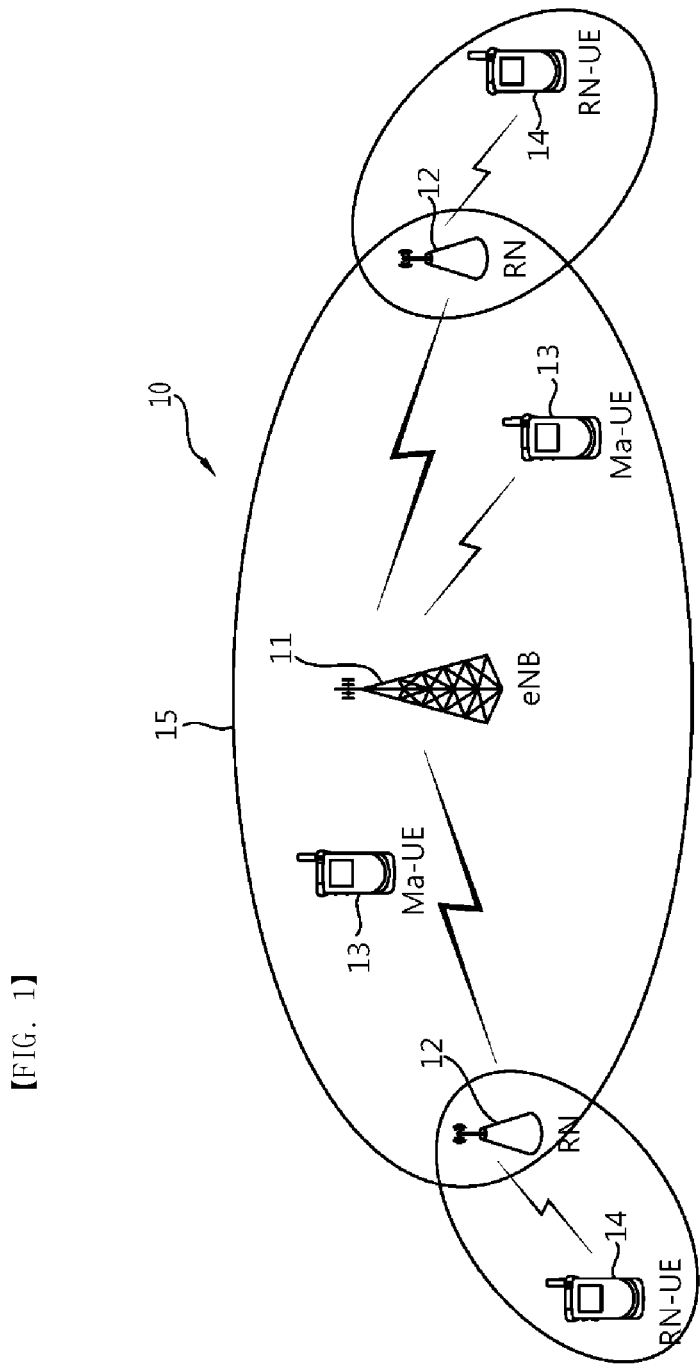
[FIG. 1]

[FIG. 2]
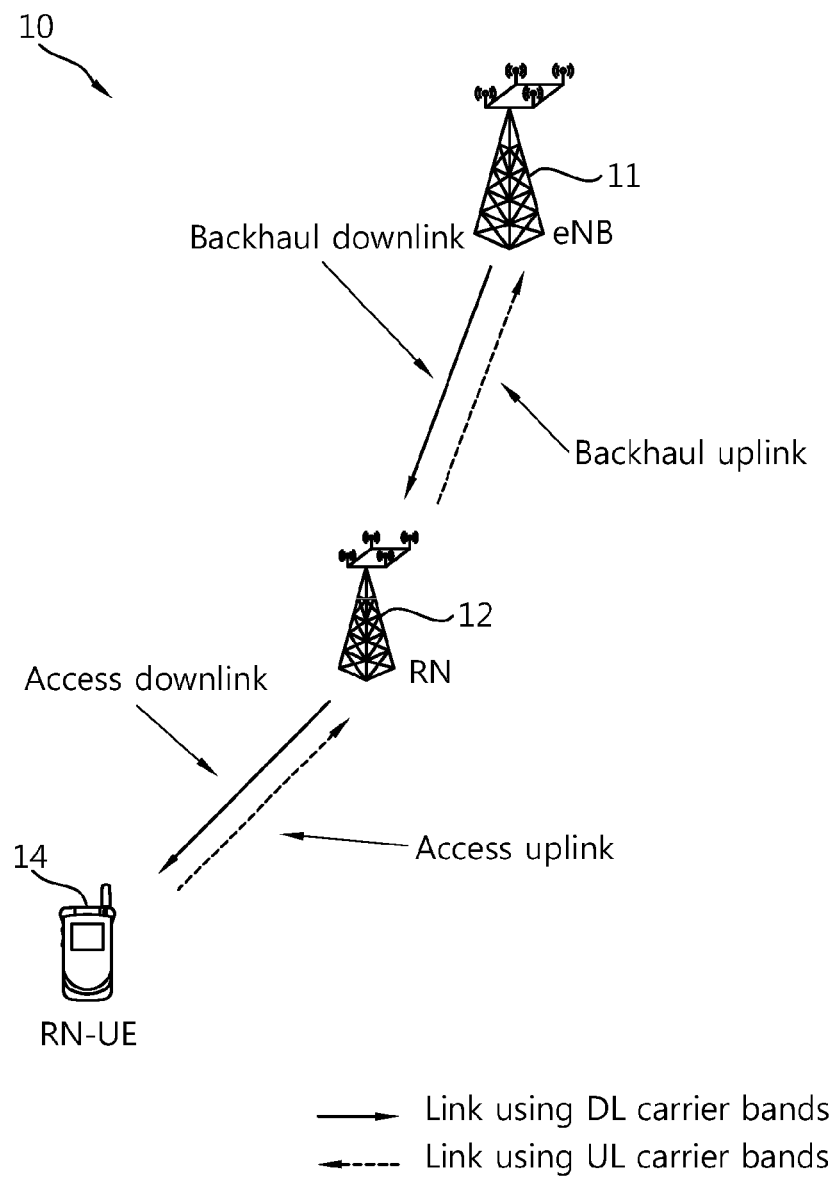

[FIG. 3]
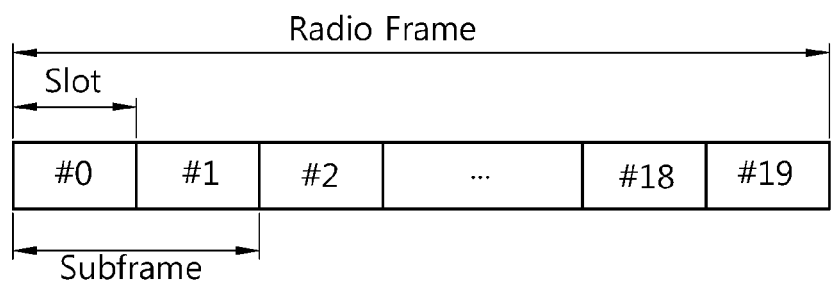

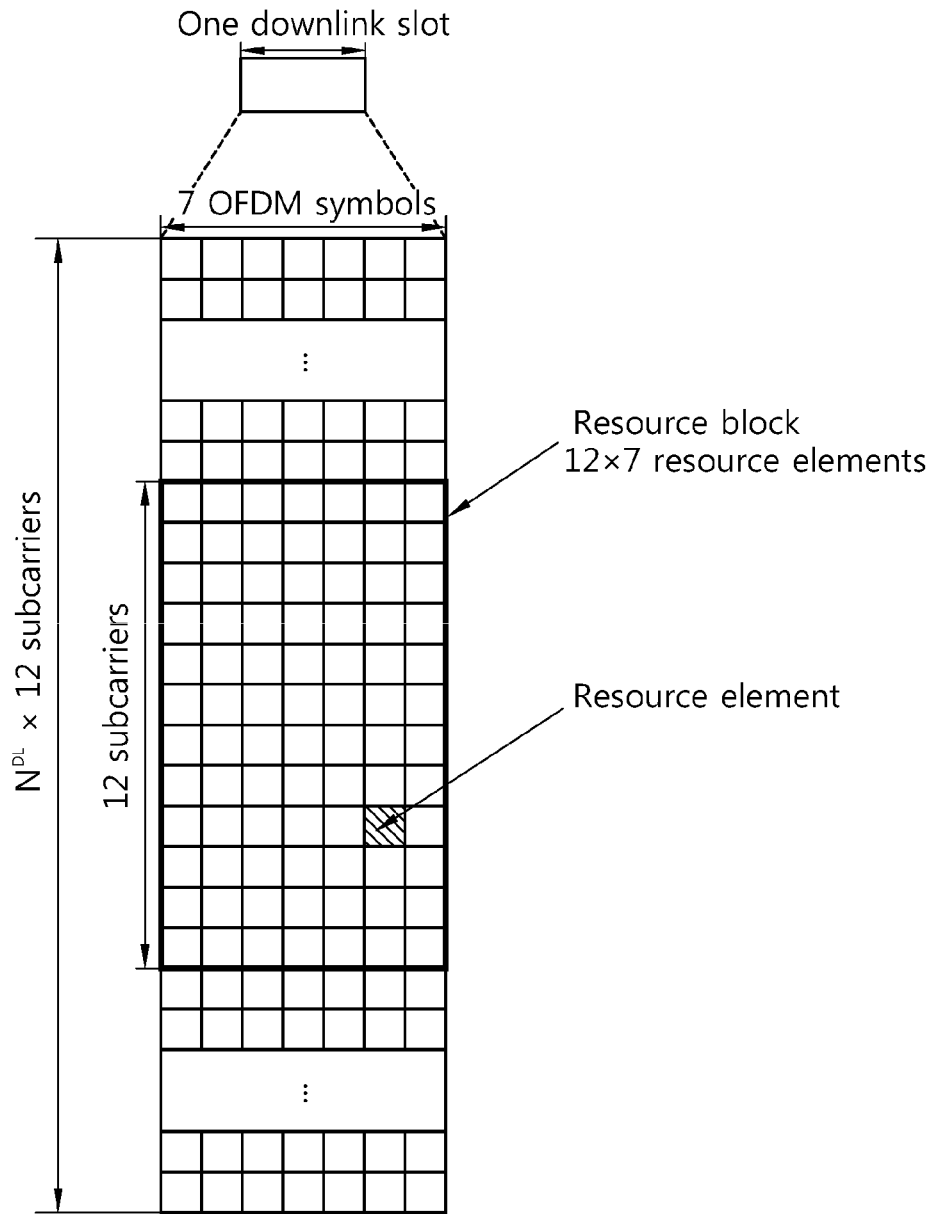
[FIG. 4]

[FIG. 5]
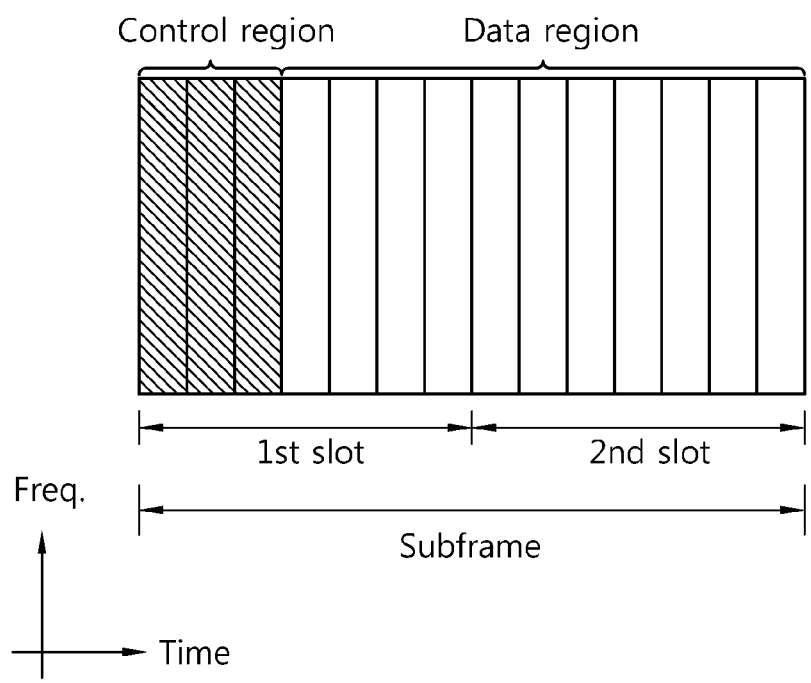

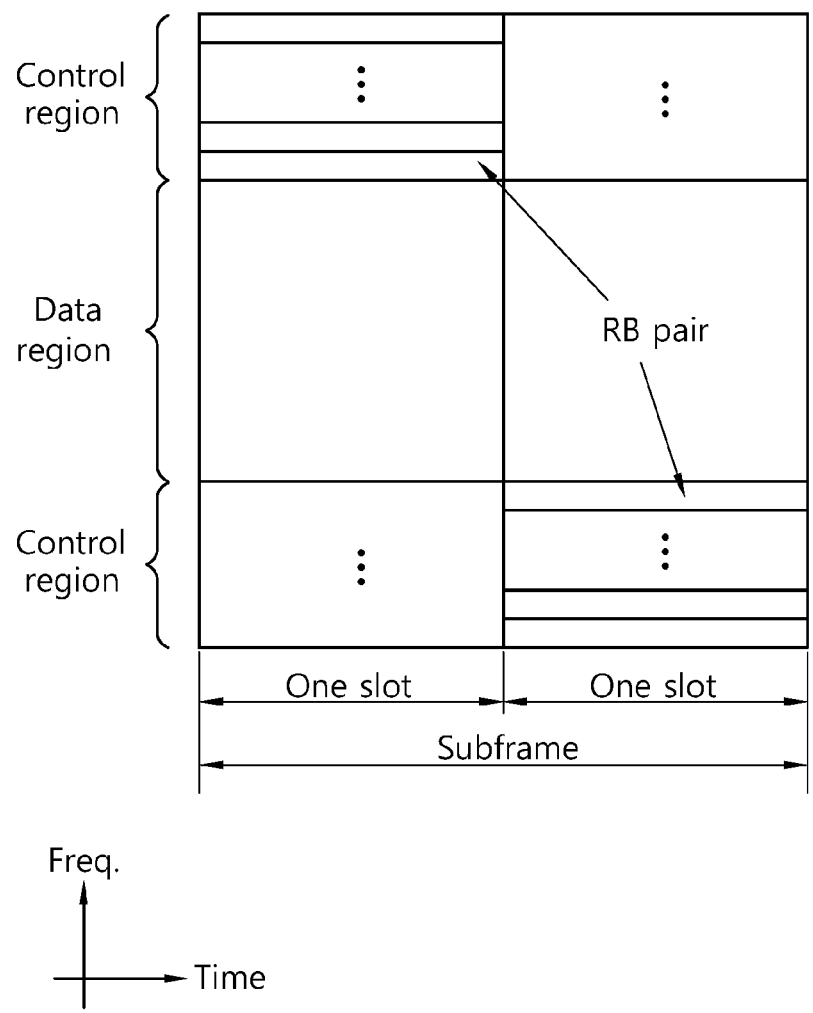
[FIG. 6]

[FIG. 7]
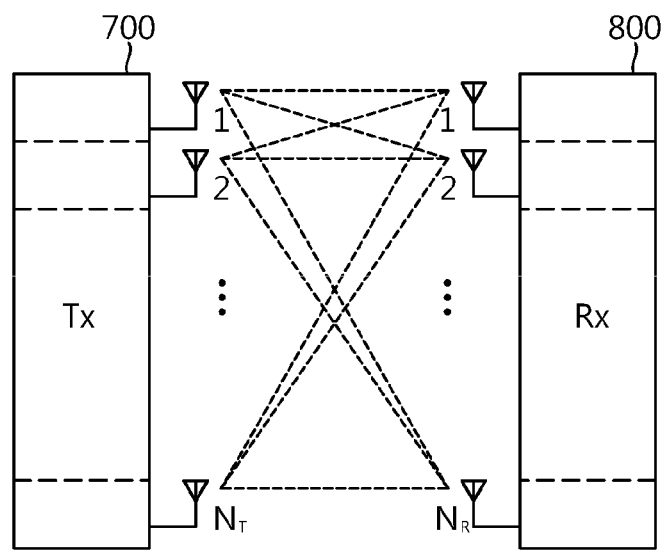
[FIG. 8]
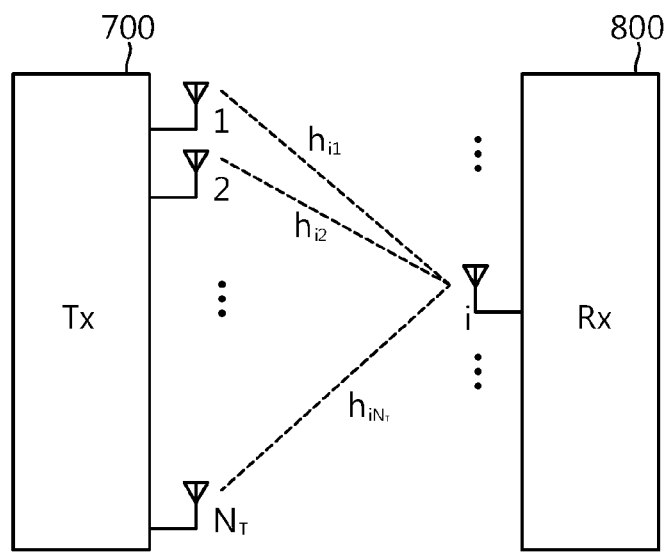

[FIG. 9]
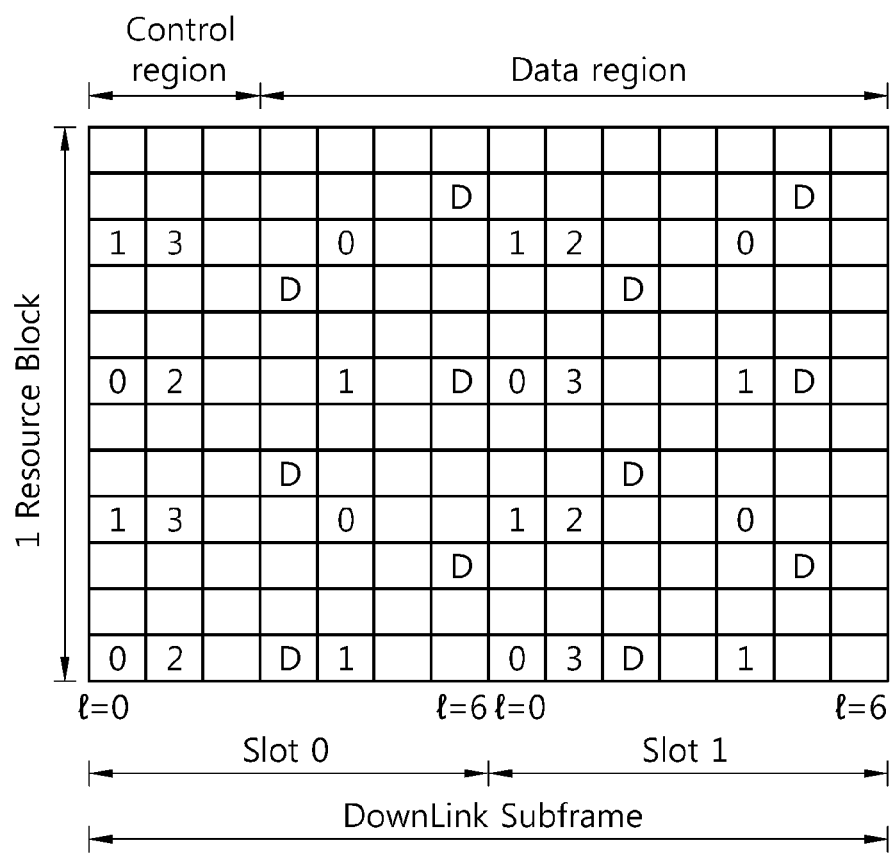

[FIG. 10]
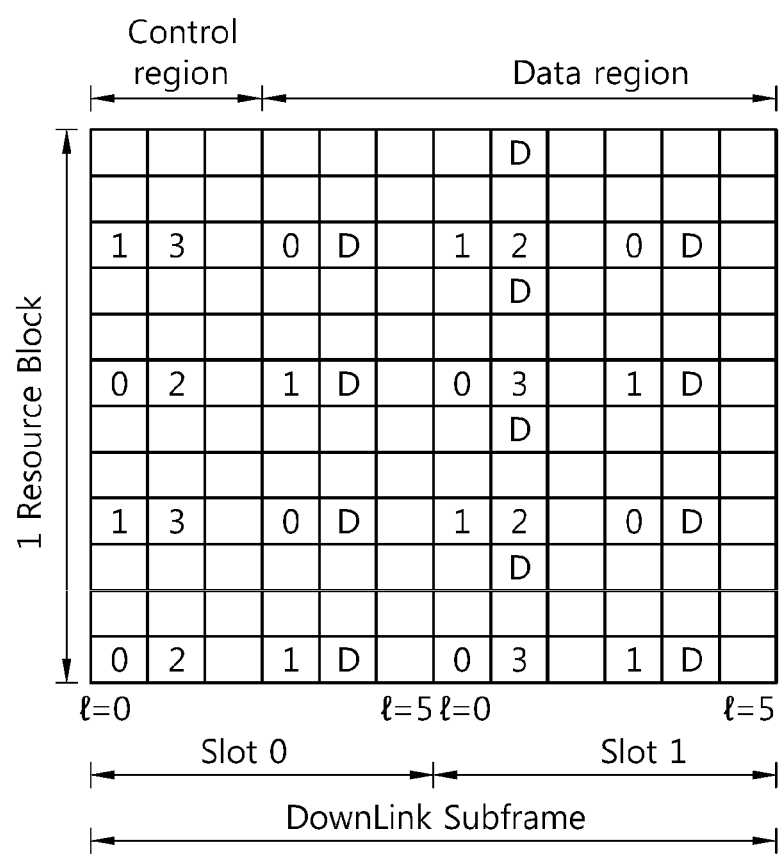

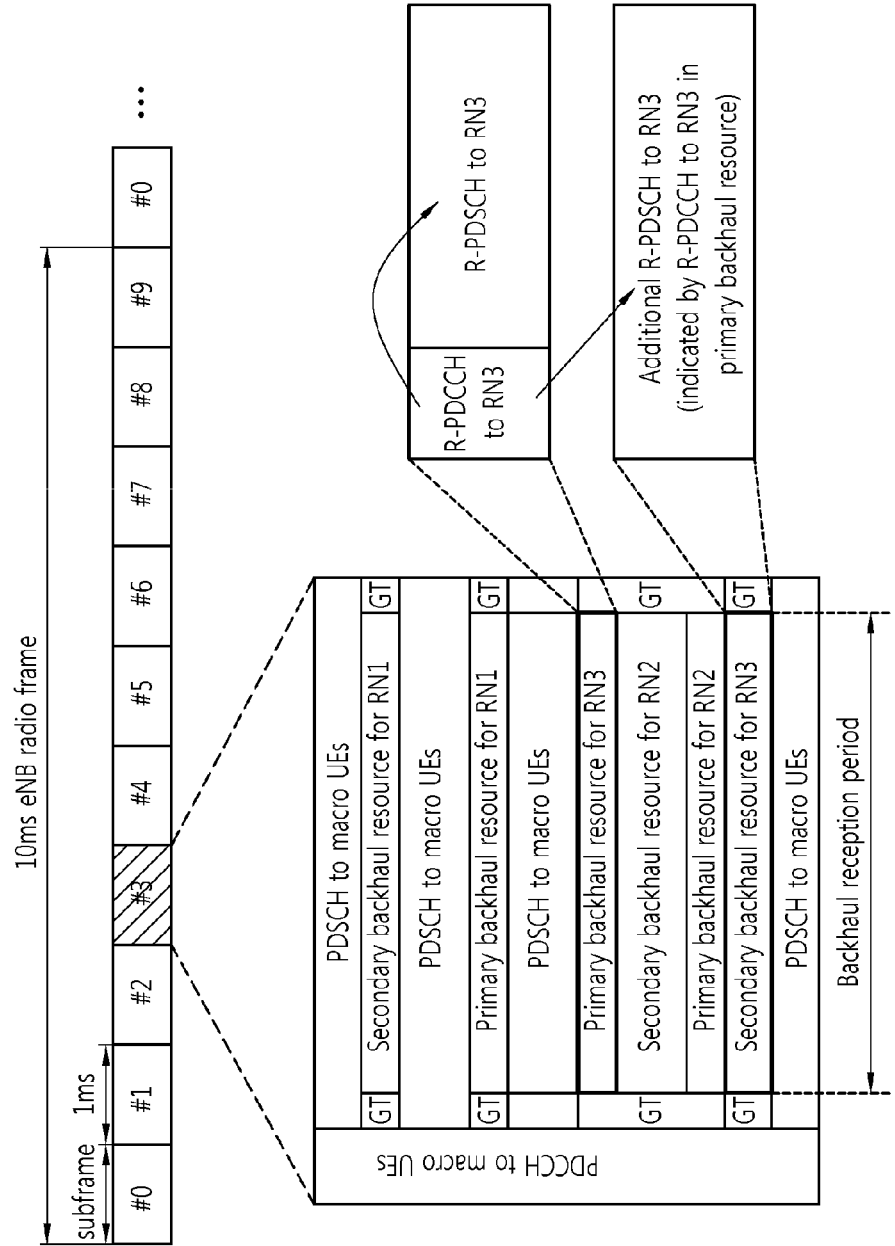

[FIG. 12]
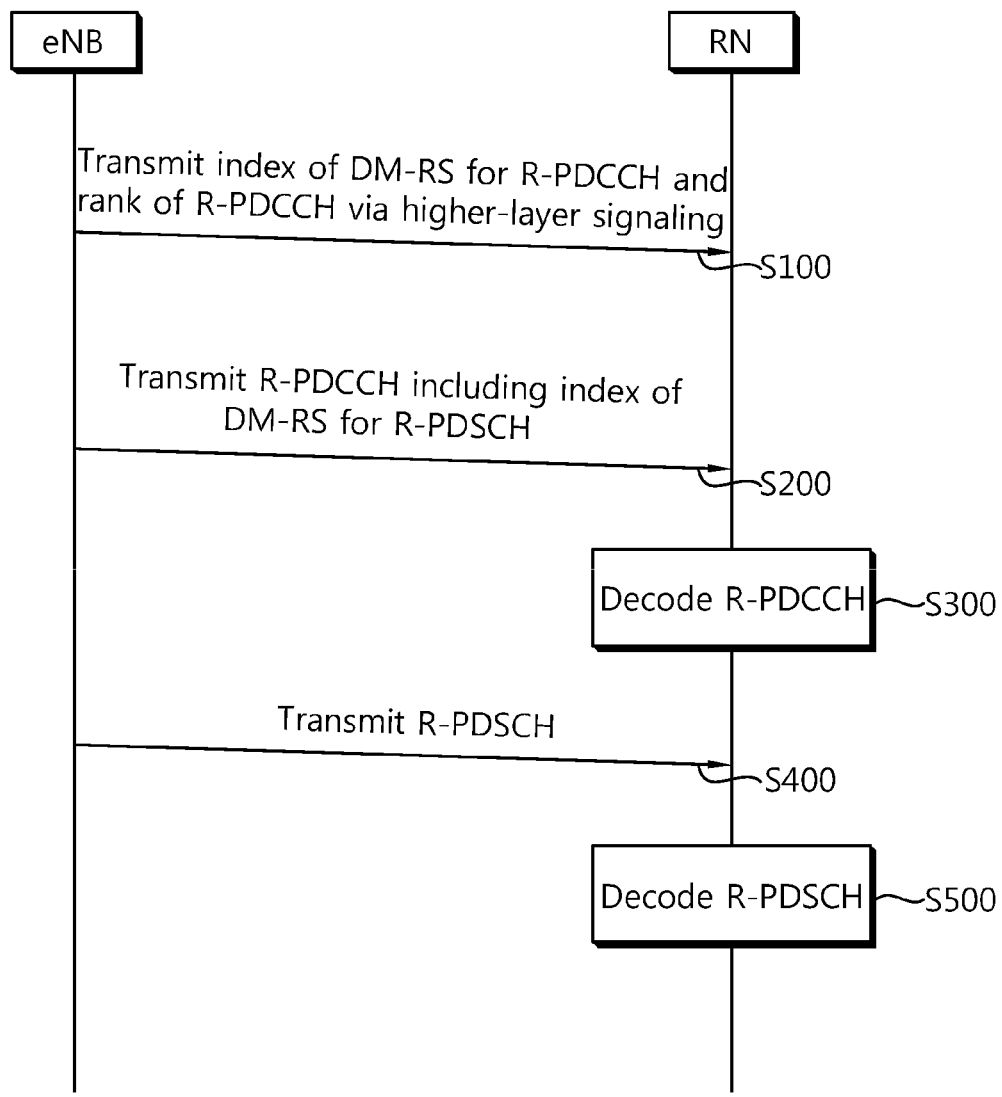

[FIG. 13]
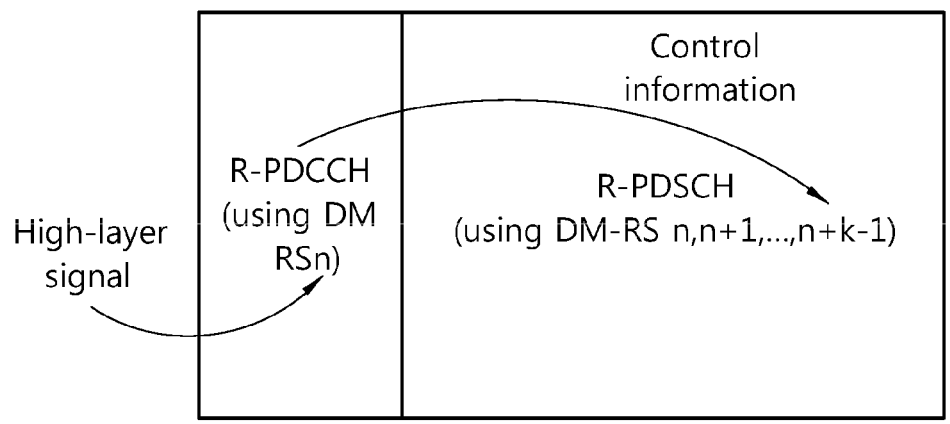

[FIG. 14]
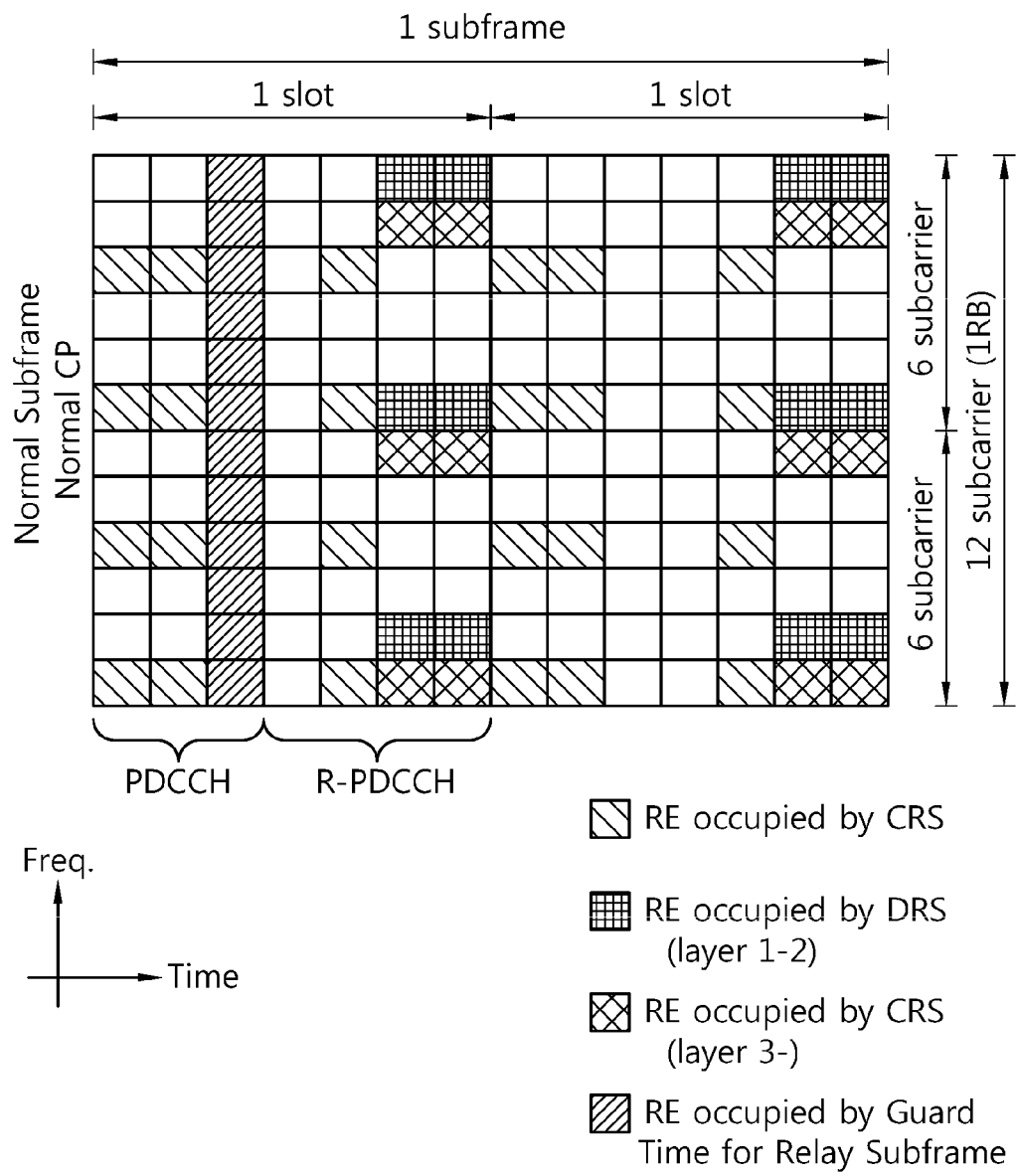

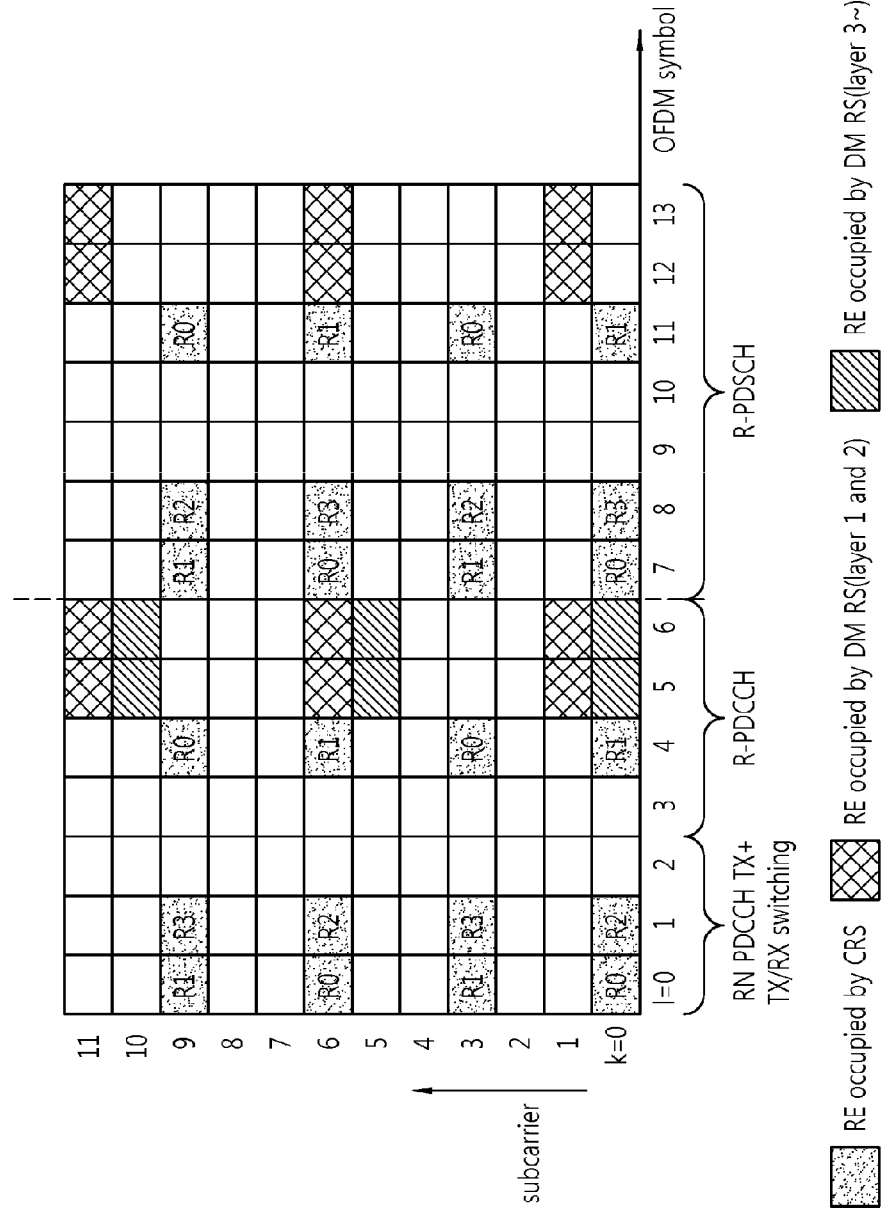
[FIG. 15]

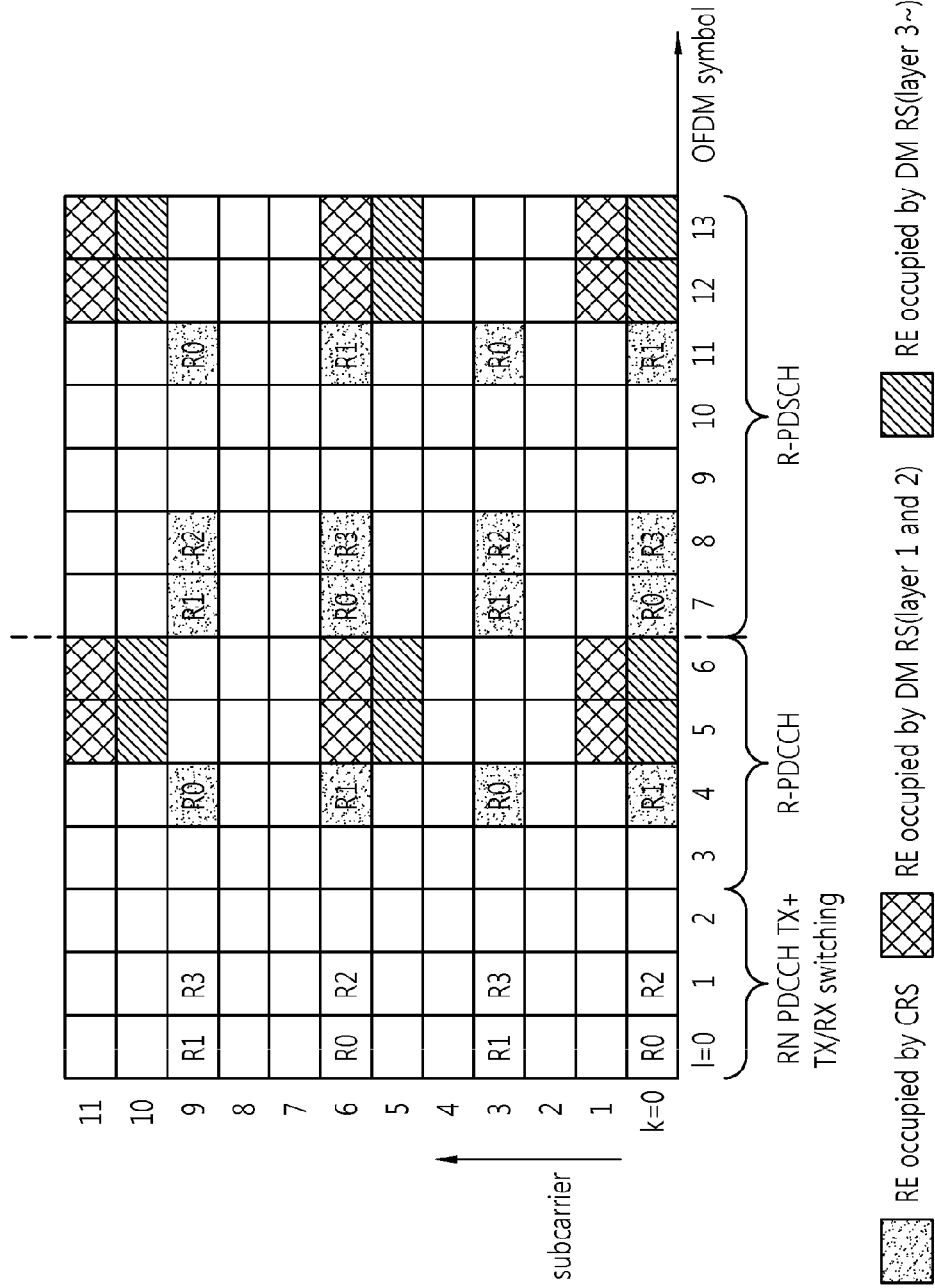
[FIG. 16]

[FIG. 17]
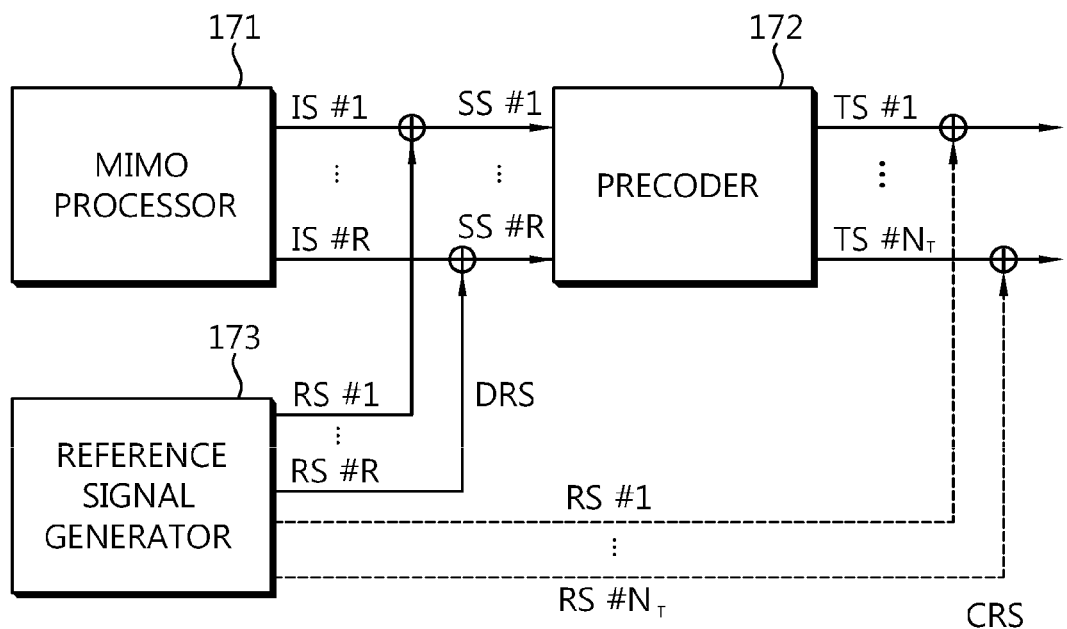

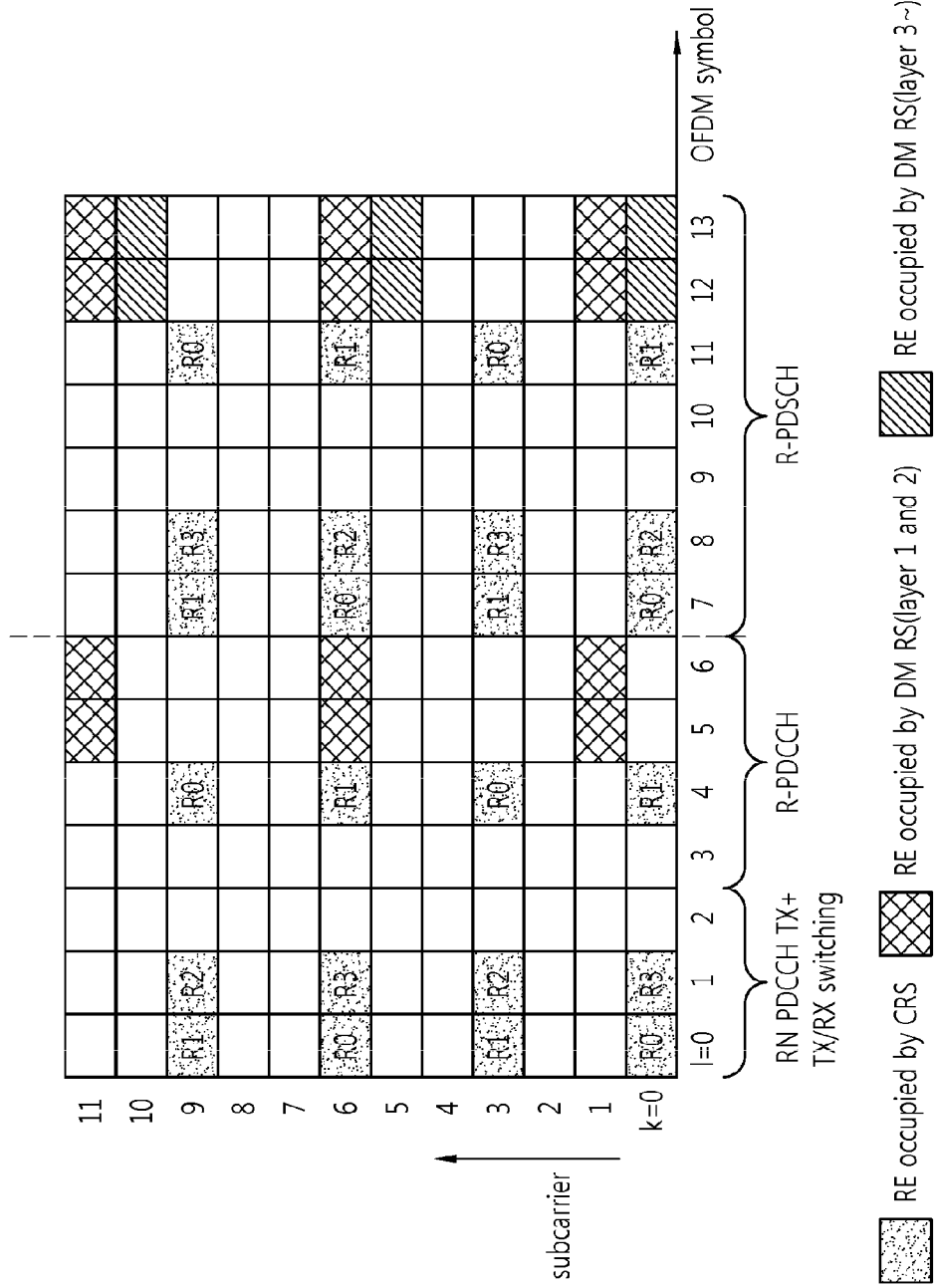

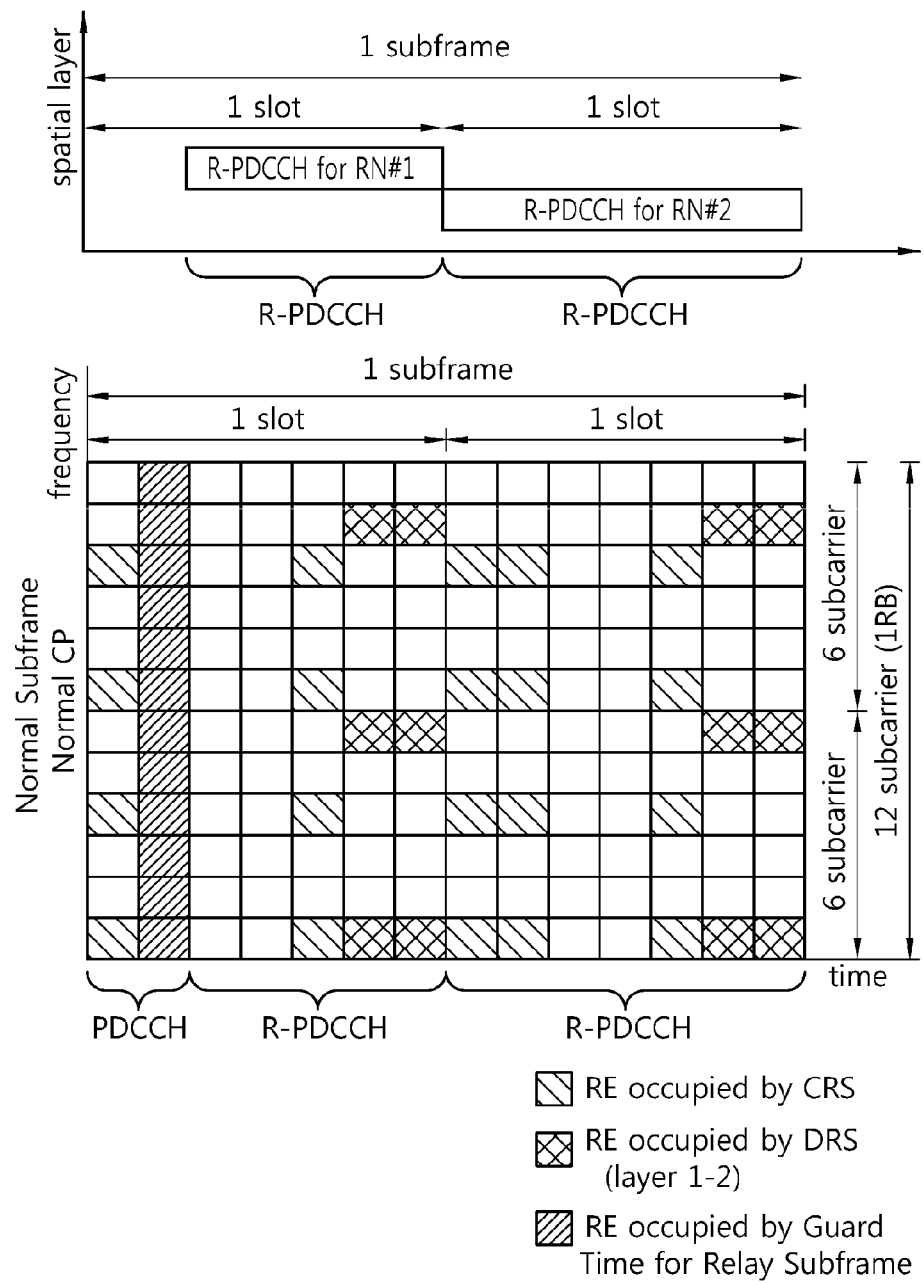
[FIG. 19]

[FIG. 20]
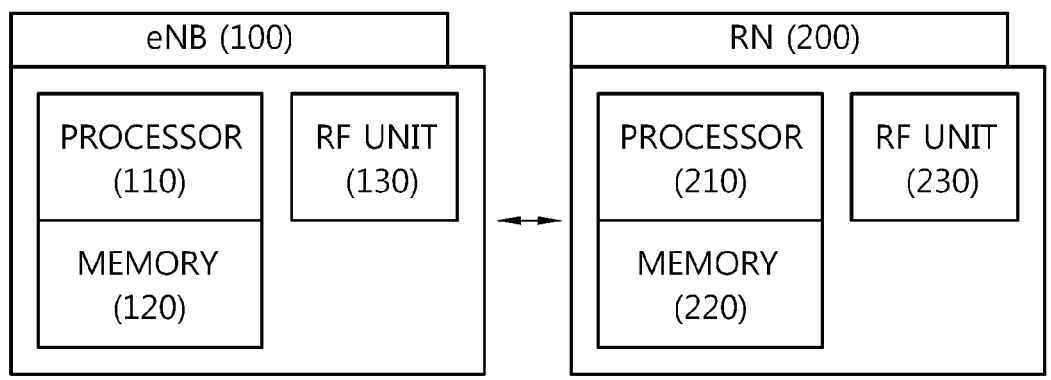

METHOD OF RELAY NODE USING REFERENCE SIGNAL AND RELAY NODE USING THE METHOD

CROSS-REFERENCE TO RELATED APPLICATIONS

This application is a continuation of co-pending U.S. application Ser. No. 13/391,193 filed on Feb. 17, 2012, which is the National Phase of PCT/KR2010/005466 filed on Aug. 18, 2010, which claims the benefit under 35 U.S.C. 119(e) of U.S. Provisional Application Nos. 61/235,322 filed on Aug. 19, 2009, 61/254,744 filed Oct. 25, 2009, 61/256,272 filed on Oct. 29, 2009, 61/307,409 filed on Feb. 23, 2010, 61/322,816 filed on Apr. 9, 2010, 61/322,908 filed on Apr. 11, 2010, 61/325,353 filed on Apr. 18, 2010, 61/334,582 filed on May 14, 2010, 61/357,513 filed on Jun. 22, 2010, and claims priority under 35 U.S.C. 119 (a) to Patent Application No. 10-2010-0076740 filed in Republic of Korea on Aug. 10, 2010. The contents of all of these applications are hereby incorporated by reference as fully set forth herein in their entirety.

BACKGROUND OF THE INVENTION

Field of the Invention

The present invention relates to wireless communication, and more particularly, to which reference signal will be used by a relay node when control information and data received from a base station are demodulated in a wireless communication system including relay nodes and according to which method a reference signal will be sent by a base station.

Discussion of the Related Art

In the ITU-R (International Telecommunication Union Radio communication sector), a standardization work for IMT (International Mobile Telecommunication)-Advanced (i.e., the next-generation mobile communication system after the third generation) is in progress. IMT-Advanced sets its goal to support Internet Protocol (IP)-based multimedia service at the data transfer rate of 1 Gbps in stop and slow-speed moving states and of 100 Mbps in a fast-speed moving state.

3GPP (3rd Generation Partnership Project) is a system standard which fulfills the requirements of IMT-Advanced, and it prepares improved LTE-Advanced (LTE-A) of LTE (Long Term Evolution) based on OFDMA (Orthogonal Frequency Division Multiple Access)/SC-FDMA (Single Carrier-Frequency Division Multiple Access) transmission schemes. The LTE-A is one of the strong candidates for IMT-Advanced. Relay node technology is included in the major technologies of the LTE-A.

A relay node is an apparatus for relaying signals between a base station and a user equipment and used to extend the cell coverage of a wireless communication system and improve the throughput.

It becomes problematic that such a relay node will demodulate a signal received from a base station using which reference signal. For example, in order for a relay node to demodulate control information of a control channel received from a base station, the relay node has to know which reference signal has been allocated to a radio resource region to which the control information is allocated.

SUMMARY OF THE INVENTION

It is an object of the present invention to provide a method of a relay node using a reference signal in case where the relay node demodulates a signal received from a base station and a relay node using the method.

A method of a relay node (RN) using a reference signal according to an aspect of the present invention includes receiving information about a Dedicated Reference Signal (DRS) which is used to demodulate a control channel via high-layer signaling from an evolved-NodeB (eNB); receiving control information through the control channel from the eNB; receiving data through a data channel from the eNB; and demodulating the control information and the data. Here, the control information is demodulated using a DRS indicated by the information about the DRS, and the data are demodulated using a DRS indicated by the control information.

The high-layer signaling can include a Radio Resource Control (RRC) message.

The information about the DRS may be a DRS index which can include at least one of the index of an antenna port in which the DRS is transmitted and a scramble ID index used to generate the DRS.

The eNB can send the control channel in OFDM symbols used by the eNB in order to send the control channel to a Macro User Equipment (Ma-UE) and at least one OFDM symbol placed after a guard time necessary for the RN to perform transmission and reception switching, in a subframe including a plurality of OFDM symbols in a time domain and a plurality of subcarriers in a frequency domain.

A set of DRSs used to demodulate data transmitted through a data channel in a frequency band in which the control channel is transmitted can include all sets of DRSs used to demodulate the control information transmitted through the control channel.

A set of DRSs used to demodulate data transmitted through a data channel placed in a frequency band different from a frequency band in which the control channel is transmitted can include all sets of DRSs used to demodulate the control information transmitted through the control channel.

The control information can be mapped to a resource element not overlapping with resource elements in which a DRS for a maximum transmission rank of the control channel and a DRS for a maximum transmission rank of the data channel can be disposed.

In case where the number of ranks in which the control information is transmitted by the eNB is different from the number of ranks in which the data are transmitted by the eNB, a precoding vector applied to the control channel can be composed of a column vector of a precoding matrix applied to the data channel.

A transmission rank value of the control information may be a fixed value, The control information received through the control channel can further include the value of a transmission rank in which the data are transmitted through the data channel.

The method can further include receiving information, indicating whether a subframe through which the control information and the data are received is an MBSFN subframe, from the eNB.

If the RN determines that the subframe is the MBSFN subframe on the basis of the information indicating whether the subframe is the MBSFN subframe the RN demodulates the control information assuming that a Common Reference Signal (CRS) is only positioned in the first OFDM symbol and the second OFDM symbol in the subframe. An RN according to another aspect of the present invention includes a Radio Frequency (RF) unit configured to send and receive a radio signal; and a processor connected to the RF unit. Here, the processor receives information about a DRS used to demodulate a control channel via high-layer signaling from an eNB, receives control information through the control channel from the eNB, receives data through a data channel from the eNB, and demodulate the control information and the data, wherein the control information is demodulated using a DRS indicated by information about the DRS, and the data are demodulated using a DRS indicated by the control information.

In accordance with the present invention, a relay node can accurately demodulate a control channel because it can know a reference signal applied to a control channel received from a base station via high-layer signaling. Further, a relay node can accurately demodulate a control channel even though a control channel and a data channel received from a base station have different transmission ranks.

BRIEF DESCRIPTION OF THE DRAWINGS

FIG. 1 is a diagram showing a wireless communication system including RNs;

FIG. 2 is an exemplary diagram showing links existing in the wireless communication system including the RNs;

FIG. 3 is a diagram showing a radio frame structure of 3GPP LTE;

FIG. 4 is an exemplary diagram showing a resource grid for one downlink slot;

FIG. 5 is a diagram showing the structure of a downlink subframe;

FIG. 6 is a diagram showing the structure of an uplink subframe;

FIG. 7 is a diagram showing an MIMO system;

FIG. 8 is an example showing channels in a multi-antenna system;

FIG. 9 is a diagram showing an example of an RS structure which can support four antenna ports in a normal CP;

FIG. 10 is a diagram showing an example of an RS structure which can support four antenna ports in an extended CP;

FIG. 11 is a diagram showing an example of a subframe structure which can be used in backhaul downlink between a base station and an RN;

FIG. 12 is a diagram showing a signaling process between a base station and an RN in case where a DM-RS is used in both an R-PDCCH and an R-PDSCH;

FIG. 13 is a diagram showing a relationship between the DM-RS index of an R-PDCCH and the DM-RS index of an R-PDSCH in case where a set of DM-RSs in which DM-RS indices are consecutive to each other is used to send R-PDSCHs;

FIG. 14 is a diagram showing an example of a RS resource element which can be allocated within a backhaul downlink subframe in a normal CP;

FIG. 15 is a diagram showing an example of a DM-RS resource element which is assumed by an RN in the R-PDCCH region of a backhaul downlink subframe;

FIG. 16 is a diagram showing an example of the DM-RS resource element of a backhaul downlink subframe;

FIG. 17 is a diagram showing an example of a transmitter structure according to an embodiment of the present invention;

FIG. 18 is a diagram showing an example in which a base station maps DM-RS resource elements to R-PDCCH regions and R-PDSCH regions according to their ranks;

FIG. 19 is a diagram showing an example in which a plurality of R-PDCCHs is transmitted through different spatial layers in case where the plurality of R-PDCCHs is multiplexed within one resource block in the frequency domain; and FIG. 20 is a block diagram showing a base station and an RN.

DETAILED DESCRIPTION OF THE INVENTION

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). 3GPP (3rd Generation Partnership Project) Long Term Evolution (LTE) is part of Evolved UTMS (E-UMTS) using E-UTRA. The 3GPP LTE adopts OFDMA in the downlink and SC-FDMA in the uplink. LTE-Advanced (LTE-A) is the evolution of 3GPP LTE. In order to clarify a description, 3GPP LTE/LTE-A is chiefly described as examples, but the technical spirit of the present invention is not limited thereto.

FIG. 1 is a diagram showing a wireless communication system including relay nodes.

Referring to FIG. 1, the wireless communication system 10 includes an evolved-NodeB (or eNodeB or eNB) 11 including relay nodes RN. The eNB 11 provides communication services to a geographical area 15 called, in general, a cell. The cell can be divided into a plurality of areas. Each of the areas is called a sector. One or more cells can exist in one eNB. The eNB 11 refers to a fixed station which communicates with User Equipments (hereinafter referred to as UEs) 13, and it can also be referred to as another terminology, such as a Base Station (BS), a Base Transceiver System (BTS), an access Point, or an access network (AN). The eNB 11 can perform functions, such as connectivity, management, control, and resource allocation between a relay node (hereinafter referred to as an RN) 12 and a UE 14.

The RN 12 refers to a device for relaying signals between the eNB 11 and the UE 14, and it can also be referred to as another terminology, such as a Relay Station (RS), a repeater, or a relay. Any method, such as AF (amplify and forward) or DF (decode and forward), can be used as a relay method used by an RN, but the technical spirit of the present invention is not limited thereto.

The UEs 13 and 14 can be fixed and mobile and also referred to as another terminology, such as a Mobile Station (MST), a User Terminal (UT), a Subscriber Station (SS), a wireless device, a Personal Digital Assistant (PDA), a wireless modem, a handheld device, and an Access Terminal (AT). Hereinafter, a macro UE (hereinafter referred to as an Ma-UE) 13 refers to a UE directly communicating with the eNB 11, and a relay node UE (hereinafter referred to as an RN-UE) 14 refers to a UE communicating with an RN. The Ma-UE 13 within the cell of the eNB 11 can communicate with the eNB 11 via the RN 12 in order to improve the transfer rate according to a diversity effect.

FIG. 2 is an exemplary diagram showing links existing in the wireless communication system including the RNs.

There can be a difference between a link in a wireless communication system in which an RN is placed between an eNB and a UE and a link in a wireless communication system in which only an eNB and a UE exists. Downlink between an eNB and a UE refers to a communication link from the eNB to the UE, and uplink therebetween refers to a communication link from the UE to the eNB. In case where Time Division Duplex (TDD) is used, downlink transmission and uplink transmission are performed in different subframes. In case where Frequency Division Duplex (FDD) is used, downlink transmission and uplink transmission are performed in different frequency bands. In TDD, downlink transmission and uplink transmission are performed in different times and the same frequency band can be used. Meanwhile, although downlink transmission and uplink transmission can be performed at the same time in FDD, different frequency bands are used.

In case where an RN is included between an eNB and a UE, a backhaul link and an access link can be added in addition to the above-described uplink and downlink. A backhaul link refers to a communication link between an eNB and an RN and includes backhaul downlink in which the eNB sends a signal to the RN and backhaul uplink in which the RN sends a signal to the eNB. The access link refers to a communication link between an RN and a UE connected to the RN (hereinafter referred to as an RN-UE) and includes access downlink in which the RN sends a signal to the RN-UE and access uplink in which the RN-UE sends a signal to the RN.

FIG. 3 is a diagram showing a radio frame structure of 3GPP LTE.

Referring to FIG. 3, a radio frame includes 10 subframes and one subframe includes two slots. The length of one subframe can be 1 ms, and the length of one slot can be 0.5 ms. The time that it takes to send one subframe is referred to as a Transmission Time Interval (TTI). The TTI can be a minimum unit of scheduling.

One slot can include a plurality of OFDM (orthogonal frequency division multiplexing) symbols in the time domain. An OFDM symbol is used to express one symbol period because 3GPP LTE uses OFDMA in the downlink and thus can be referred to as another terminology. For example, in case where SC-FDMA is used as an uplink multi-access method, the OFDM symbol can be said to be an SC-FDMA symbol. Although one slot is illustrated to include 7 OFDM symbols, the number of OFDM symbols included in one slot can be changed according o the length of a Cyclic Prefix (CP). In accordance with 3GPP TS 36.211 V8.5.0 (2008-12), in a normal CP, one subframe includes 7 OFDM symbols. In an extended CP, one subframe includes 6 OFDM symbols. The structure of a radio frame is only illustrative, and the number of subframes included in a radio frame and the number of slots included in a subframe can be changed in various ways. Hereinafter, a symbol can refer to one OFDM symbol or one SC-FDMA symbol.

For the structure of the radio frame described above with reference to FIG. 3, reference can be made to Paragraphs 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

FIG. 4 is an exemplary diagram showing a resource grid for one downlink slot.

In a radio frame used in FDD or TDD, one slot includes a plurality of OFDM (orthogonal frequency division multiplexing) symbols in the time domain and a plurality of Resource Blocks (RBs) in the frequency domain. The resource block includes a plurality of contiguous subcarriers in one slot in the unit of resource allocation.

Referring to FIG. 4, one downlink slot is illustrated to include 7 OFDM symbols and one resource block is illustrated to include 12 subcarriers in the frequency domain, but not limited thereto. In the resource block, a subcarrier can have an interval of, for example, 15 KHz.

Each of elements on the resource grid is referred to as a resource element, and one resource block includes 12×7 resource elements. The number of resource blocks $N^{DL}$ included in a downlink slot depends on a downlink transmission bandwidth set in a cell. The resource grid shown in FIG. 4 can also be applied to uplink.

FIG. 5 is a diagram showing the structure of a downlink subframe.

Referring to FIG. 5, the subframe includes two consecutive slots. 3 OFDM symbols anterior to the first slot within the subframe correspond to a control region to which Physical Downlink Control Channels (PDCCHs) are allocated, and the remaining OFDM symbols correspond to a data region to which Physical Downlink Shared Channels (PDSCHs) are allocated. Control channels, such as a Physical Control Format Indicator Channel (PCFICH) and a Physical HARQ Indicator Channel (PHICH) can also be allocated to the control region in addition to the PDCCHs. A UE can decode control information transmitted through a PDCCH and read data information transmitted through a PDSCH. In this case, although the control region is illustrated to include 3 OFDM symbols, two OFDM symbols or one OFDM symbol can be included in the control region. The number of OFDM symbols included in the control region within the subframe can be known through a PCFICH. The PHICH carries information indicating whether the reception of uplink data sent by a UE is successful or not.

The control region includes a logical Control Channel Element (hereinafter referred to as a CCE) including a plurality of CCEs. The CCE column is a set of all CCEs which constitute the control region within one subframe. The CCE corresponds to a plurality of Resource Element Group (hereinafter referred to as an REG). For example, the CCE can correspond to 9 REGs. The REG is used to define that a control channel is mapped to a resource element. For example, one REG can include 4 resource elements.

A plurality of PDCCHs can be transmitted within the control region. The PDCCH carries control information such as scheduling allocation. The PDCCH is transmitted on one CCE or an aggregation of several consecutive CCEs. A format and the number of bits of available PDCCHs are determined according to the number of CCEs constituting the CCE aggregation. The number of CCEs used for PDCCH transmission is referred to as a CCE aggregation level. Further, the CCE aggregation level is a CCE unit for searching for PDCCHs. The size of a CCE aggregation level is defined by the number of contiguous CCEs. For example, the CCE aggregation level can be an element of $\{1, 2, 4, 8\}$.

Control information transmitted through the PDCCH is referred to as Downlink Control Information (hereinafter referred to as DCI). The DCI includes uplink scheduling information, downlink scheduling information, system information, a uplink power control command, control information for paging, control information to indicate an random access response (RACH response), and so on.

The DCI format can include a format 0 for Physical Uplink Shared Channel (PUSCH) scheduling, a format 1 for the scheduling of one Physical Downlink Shared Channel (PDSCH) codeword, a format 1A for the compact scheduling of one PDSCH codeword, a format 1B for a compact scheduling for rank-1 transmission of a single codeword in a spatial multiplexing mode, a format 1C for the very compact scheduling of a Downlink Shared Channel (DL-SCH), a format 1D for PDSCH scheduling in a multi-user spatial multiplexing mode, a format 2 for PDSCH scheduling in a closed-loop spatial multiplexing mode, a format 2A for PDSCH scheduling in an open-loop spatial multiplexing mode, a format 3 for the transmission of a Transmission Power Control (TPC) command to control 2-bit power for a PUCCH and a PUSCH, and a format 3A for the transmission of a TPC command to control 1-bit power control for a PUCCH and a PUSCH.

FIG. 6 is a diagram showing the structure of an uplink subframe.

Referring to FIG. 6, the uplink subframe can be divided into a control region to which PUCCHs (Physical Uplink Control Channels) carrying uplink control information are allocated and a data region to which PUSCHs (Physical Uplink Shared Channels) carrying user data are allocated, in the frequency domain.

A PUCCH for one UE is allocated in the form of a pair of resource blocks (RBs) 51 and 52 in the subframe, and the RBs 51 and 52 belonging to the RB pair occupy different subcarriers in two slows. This is called that an RB pair allocated to PUCCHs is frequency-hopped in the slot boundary.

The PUCCH can support multiple formats. That is, the PUCCH can transmit uplink control information having a different bit number for every subframe according to a modulation scheme. For example, in case where Binary Phase Shift Keying (BPSK) is used (i.e., PUCCH format 1a), uplink control information of one bit can be transmitted on the PUCCH. In case where Quadrature Phase Shift Keying (QPSK) is used (i.e., PUCCH format 1b), uplink control information of 2 bits can be transmitted on the PUCCH. The PUCCH format can include a format 1, a format 2, a format 2a, and a format 2b in addition to the above formats (For the PUCCH formats, reference can be made to section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)").

A wireless communication system (e.g., the wireless communication system described with reference to FIG. 1) can be a system using Multi-Input Multi-Output (MIMO) technology (i.e., an MIMO system). The MIMO technology has overcame technology using one transmission antenna and one reception antenna and is adopting multiple transmission antennas and multiple reception antennas in order to improve the transfer efficiency of data transmitted and received. In other words, the MIMO technology uses a plurality of antennas in the transmitter or receiver of a wireless communication system. If the MIMO technology is used, the performance and communication capacity of a wireless communication system can be improved. The MIMO system is also referred to as a multi-antenna system. The MIMO technology does not depend on a single antenna path in order to receive one entire message, but is an application of technology in which pieces of data received from several antennas are gathered and completed. Consequently, the data transfer rate can be improved in a specific range, or a system range for a specific data transfer rate can be increased.

The next-generation mobile communication technology requires a higher data transfer rate than a conventional mobile communication technology. Accordingly, the MIMO technology can be said to be indispensable for the next-generation mobile communication technology. The MIMO technology can be applied to not only an eNB, but also a UE or an RN in order to overcome the limitations of the data transfer rate. Further, the MIMO technology is technically advantageous in that it can improve the data transfer efficiency without using additional frequency bands or requiring additional transmission power and thus has been in the spotlight as compared with other technologies.

First, the mathematical modeling of an MIMO system is described.

FIG. 7 is a diagram showing an MIMO system.

Referring to FIG. 7, a transmitter (Tx) 700 have NT transmission antennas, and a receiver (Rx) 800 have NR reception antennas. In this case, a theoretical channel transmission capacity is increased in proportion to the number of antennas.

A transfer rate acquired by an increasing channel transmission capacity can be represented by the product of a maximum transfer rate RO theoretically acquired when a single antenna is used and a rate increment Ri generated when multiple antennas are used. The rate increment Ri can be represented by the following equation.

$$R_i = \min(N_T, N_R) \qquad \text{[Equation 1]}$$

Transmission information can include a maximum of NT different pieces of information in case where the number of transmission antennas is NT. In this case, the transmission information can be represented by the following equation 2.

$$s = [s_1, s_2, \ldots, s_{N_T}]^T \qquad \text{[Equation 2]}$$

In Equation 2, s indicates a transmission information vector, and $s_1, s_2, \ldots, s_{N_T}$ indicate respective pieces of information (i.e., respective elements of the transmission information vector). Each piece of information can be transmitted with a different transmission power. In case where the transmission powers are denoted by $P_1, P_2, \ldots, P_{N_T}$, a transmission information vector to which the transmission powers have been applied can be represented by the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Equation 3 can be represented by the product of a transmission power diagonal matrix and a transmission information vector as in the following equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The transmission information vector ŝ to which the transmission powers have been applied is multiplied by a weight matrix W, thereby generating transmission signals $x_1, x_2, \ldots, x_{N_T}$ which are actually transmitted through $N_T$ transmission antennas. The weight matrix W functions to properly distribute pieces of transmission information into respective antennas according to transmission channel conditions. Assuming that the transmission signal vector is x, the transmission signal vector can be represented by the following equation.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In Equation 5, an element $w_{ij}$ ($1 \leq i \leq N_T$, $1 \leq j \leq N_T$) of the weight matrix indicates a weight for an $i^{th}$ transmission antenna and $j^{th}$ transmission information. The weight matrix W is also referred to as a precoding matrix.

A transmission signal vector can include a different piece of transmission information according to a transmission scheme. For example, in case where a spatial diversity (i.e., transmit diversity) is applied, the transmission signal vector can have the same transmission information. That is, [$s_1$, $s_2$, ..., $s_{nT}$] can be the same information (e.g., [$s_1$, $s_1$, ..., $s_1$]). Since the same transmission information is transferred to a receiver through different channels, a diversity effect is increased and so the reliability of transmission is increased.

For another example, in case where spatial multiplexing is applied, the transmission signal vector can have a different piece of transmission information. That is, $s_1, s_2, \ldots, s_{nT}$ can have different pieces of information. Since different pieces of transmission information are transferred to a receiver through different channels, there is an advantage in that the amount of transmission information is increased.

In some cases, both the spatial diversity and the spatial multiplexing may be used to send transmission information. That is, in the above example, the same information may be transmitted through three transmission antennas in accordance with the spatial diversity, and different pieces of information may be transmitted through the remaining transmission antennas in accordance with the spatial multiplexing. In such a case, the transmission information vector can be configured as in, for example, [$s_1$, $s_1$, $s_1$, $s_2$, $s_3$ ..., $s_{nT-2}$].

In case where the number of reception antennas of a receiver is $N_R$, a signal received by each reception antenna can be denoted by $y_n$ ($1 \leq n \leq N_R$). Here, a reception signal vector y can be represented by the following equation.

$$y = [y_1, y_2, \ldots, y_{N_R}]^T$$ [Equation 6]

In case where channel modeling is performed in an MIMO system, channels can be distinguished from each other on the basis of the indices of transmission antennas and the indices of reception antennas. Assuming that the index of the transmission antenna is j and the index of the reception antenna is i, a channel between the transmission antenna and the reception antenna can be denoted by $h_{ij}$ (It should be noted that in subscripts denoting channels, the index of a reception antenna is first indicated and the index of a transmission antenna is then indicated).

FIG. 8 is an example showing channels in a multi-antenna system.

Referring to FIG. 8, channels for respective $N_T$ transmission antennas and a reception antenna i are denoted by $h_{i1}$, $h_{i2}$, ..., $h_{iNT}$, respectively. The channels can be represented by a matrix or a vector, for convenience sake. In this case, the channels $h_{i1}$, $h_{i2}$, ..., $h_{iNT}$ can be represented in the form of a vector as in the following equation.

$$h_i^T = [h_{i1}, h_{i2}, \ldots, h_{iN_T}][$$ [Equation 7]

Assuming that the indication of all channels from an $N_T$ number of transmission antennas to an $N_R$ number of reception antennas in the form of a matrix is a channel matrix H, H can be represented by the following equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

A signal transmitted through transmission antennas is received by reception antennas via the channels shown in Equation 8. Here, in actual channels, noise is added. Such noise can be mathematically considered as Additive White Gaussian Noise (AWGN). Assuming that AWGNs added to respective reception antennas are denoted by $n_1, n_2, \ldots, n_{NR}$, respectively, the AWGNs can be represented by vectors as in the following equation, for convenience sake.

$$n = [n_1, n_2, \ldots, n_{N_R}]^T$$ [Equation 9]

A reception signal vector y received by the reception antennas can be represented by the following equation with consideration taken of the above-described AWGN, transmission signal vector x, and channel matrix, etc.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the channel matrix H, the number of rows and the number of columns are determined by the number of transmission antennas and the number of reception antennas. In the channel matrix H, the number of rows is equal to the number of reception antennas. Further, in the channel matrix H, the number of columns is equal to the number of transmission antennas. Accordingly, the channel matrix H can be represented by an $N_R \times N_T$ matrix.

In general, the rank of a matrix is defined by a smaller one of the number of independent rows and the number of independent columns. Accordingly, the rank of a matrix is not greater than the number of columns or the number of rows, and the rank of the channel matrix H is determined as in the following equation.

$$\text{rank}(H) \leq \min(N_T, N_R) \qquad \text{[Equation 11]}$$

In general, transmission information (e.g., data) is easily distorted or changed during the time for which it is transmitted through radio channels. Accordingly, in order to demodulate the transmission information without such errors, a reference signal is necessary. The reference signal is previously known to both a transmitter and a receiver and transmitted together with the transmission information. The transmission information transmitted by the transmitter experiences a channel corresponding to each transmission antenna or each layer, and so the reference signal can be allocated to each transmission antenna or each layer. The reference signals allocated to the respective transmission antennas or the respective layers can be distinguished from each other on the basis of resources, such as time, frequencies, and codes. The reference signal can be used for two kinds of purposes (i.e., the demodulation of transmission information and channel estimation).

The reference signal can be classified into two kinds according to the range of a receiver which previously knows the reference signal. The first kind of the reference signal is a reference signal known to a specific receiver (e.g., a specific UE). Such a reference signal is referred to as a Dedicated Reference Signal (hereinafter referred to as a DRS). In this sense, the DRS is also referred to as a UE-specific RS. The second kind of the reference signal is a reference signal known to all receivers (e.g., all UEs) within a cell. Such a reference signal is referred to as a Common RS (hereinafter referred to as a CRS). The CRS is also referred to as a cell-specific RS.

Further, the reference signals may be classified according to their purposes. For example, a reference signal used to demodulate data is referred to as a Demodulation Reference Signal (hereinafter referred to as a DM-RS). A reference signal used for feedback information indicative of channel states, such as a CQI, a PMI, and an RI, is referred to as a Channel State Indicator-RS (hereinafter referred to as a CSI-RS). The above DRS can be used as a DM-RS. Hereinafter, it is assumed that a DM-RS is a DRS.

FIG. 9 is a diagram showing an example of an RS structure which can support four antenna ports in a normal CP. FIG. 10 is a diagram showing an example of an RS structure which can support four antenna ports in an extended CP. The RS structures of FIGS. 9 and 10 are used in a conventional 3GPP LTE system.

In FIGS. 9 and 10, a resource element indicated by any one of numbers 0 to 3 denotes a resource element in which a cell-specific reference signal (i.e., a CRS) is transmitted. Here, any one of the numbers 0 to 3 indicates a supported antenna port. In other words, a resource element indicated by #i (where i is any one of the numbers 0 to 3) is a resource element to which a CRS for the antenna port #i is mapped. The CRS is used for channel measurement and data demodulation for each antenna port. The CRS is transmitted both in the control region and data region of a subframe.

In FIGS. 9 and 10, a resource element indicated by D indicates a resource element to which a UE-specific RS (i.e., a DRS) is mapped. The UE-specific RS can be used to transmit a single antenna port of a PDSCH. A UE is informed via high-layer signaling whether a UE-specific RS is transmitted and whether a UE-specific RS is valid in case where PDSCHs are transmitted. The UE-specific RS can be transmitted only when data need to be demodulated. The UE-specific RS can be transmitted only in the data region of a subframe.

A subframe structure applicable to backhaul downlink between an eNB and an RN and a reference signal which can be used in backhaul downlink are described below.

First, terminologies are defined for convenience sake. Hereinafter, an R-PDCCH refers to a physical control channel in which control information is transmitted from an eNB to an RN, and an R-PDSCH refers to a physical data channel in which data are transmitted from an eNB to an RN. Hereinafter, an x region refers to a radio resource region in which x is transmitted. For example, an R-PDCCH region refers to a radio resource region in which R-PDCCHs are transmitted by an eNB.

FIG. 11 is a diagram showing an example of a subframe structure which can be used in backhaul downlink between an eNB and an RN.

Referring to FIG. 11, the eNB transmits PDCCHs to an Ma-UE (In this case, the PDCCHs can also be called macro PDCCHs) in the first predetermined number of OFDM symbols of a subframe. The RN can transmit PDCCHs to an RN-UE within the first predetermined number of the OFDM symbols. The RN does not receive a backhaul signal from the eNB because of self-interference in the OFDM symbol period in which the PDCCHs are transmitted to the RN-UE.

The eNB transmits the backhaul signal to the RN after a guard time GT. The guard time is a stabilization time according to the transmission and reception switching of a signal by the RN. In FIG. 11, the guard time is illustrated to be one OFDM symbol. However, the guard time may be less or more than a period of one OFDM symbol according to conditions. Further, the guard time may be set to the period of an OFDM symbol unit or a sampling time unit in the time domain. In FIG. 11, the guard times are indicated before and after a backhaul reception time (backhaul reception period), but not limited thereto. That is, the guard time placed in the rear of the backhaul reception time may not be set according to the timing alignment relationship of the subframe. In this case, the backhaul reception time can be extended up to the last OFDM symbol of the subframe. The guard time can be defined by only a frequency band configured by an eNB in order to transmit a signal to an RN.

An eNB can classify backhaul downlink resources, allocated to an RN, into two kinds and allocate the backhaul downlink resources to the RN.

One of the two kinds is a primary backhaul region in which R-PDCCHs and R-PDSCHs can be transmitted. In the primary backhaul region, the R-PDCCHs and the R-PDSCHs can be subjected to Time Division Multiplexing (TDM). That is, the R-PDCCHs and the R-PDSCHs are multiplexed in the time domain and transmitted. The R-PDSCH can be placed in the rear of the R-PDCCH. The R-PDCCH included in the primary backhaul region can include resource allocation information about not only the R-PDSCH of a frequency band in which the R-PDCCH is transmitted, but also the R-PDSCH placed in another frequency band. Further, FIG. 11 shows an example in which the R-PDSCHs are transmitted in the primary backhaul region, but not limited thereto. In other words, only the R-PDCCHs may be transmitted in all the OFDM symbols of the primary backhaul region.

One of the two kinds is a secondary backhaul region. In the secondary backhaul region, only R-PDSCHs are transmitted. The secondary backhaul region can be indicated by an R-PDCCH included in the primary backhaul region as described above.

Backhaul signals transmitted in the primary backhaul region and the secondary backhaul region can be multiplexed with PDSCHs, sent to an Ma-UE, in the frequency domain and transmitted.

Which reference signal will be used in the R-PDCCH and the R-PDSCH of a backhaul downlink subframe is problematic.

The present invention proposes a method of using a DM-RS (i.e DRS) to transmit R-PDCCHs and R-PDSCHs (from a viewpoint of an eNB) and receive R-PDCCHs and R-PDSCHs (from a viewpoint of an RN). This method is advantageous in that an improved Multi-User (MU) MIMO (e.g., a zero-forcing MU-MIMO) is applied to the region in which the backhaul signal is transmitted. In other words, since the DM-RS is applied to all the backhaul signals (i.e., including both R-PDCCHs and R-PDSCHs) transmitted by an eNB, each of the R-PDCCHs and each of the R-PDSCHs can be spatially multiplexed with other backhaul signal and can also be efficiently spatially multiplexed with a PDSCH sent to an Ma-UE.

Hereinafter, in case where a DM-RS is used in both R-PDCCHs and R-PDSCHs, a signaling method between an eNB and an RN and a method of operating an RN are described in detail.

1. Signaling Between eNB and RN

FIG. 12 is a diagram showing a signaling process between an eNB and an RN in case where a DM-RS is used both in an R-PDCCH and an R-PDSCH.

Referring to FIG. 12, the eNB can inform the index of a DM-RS, used for R-PDCCHs, through high-layer signaling (e.g., a Radio Resource Control (RRC) message) at step S100. In this case, the index of a DM-RS commonly indicates information to identify the DM-RS. For example, the index of a DM-RS can include information about an antenna port in which the DM-RS of an R-PDCCH for each RN is transmitted, information about a scramble ID applied to an antenna port in which the DM-RS of an R-PDCCH for each RN is transmitted, or a combination of the information about the antenna port and the information about the scramble ID in which the DM-RS of the R-PDCCH is transmitted, but not limited thereto. The scramble ID of the antenna port in which the DM-RS is transmitted must be different from the scramble ID of a DM-RS antenna port which can be used to schedule other multi-user MIMO resources in the spatial domain.

A UE can perform macro PDCCH decoding using a CRS and know the index of a DM-RS used to decode the macro PDSCH as a result of the macro PDCCH decoding. However, an RN is unable to decode a macro PDCCH transmitted by an eNB. This is because the RN transmits a PDCCH to an RN-UE during the time for which the eNB transmits the macro PDCCH as described above. That is, the RN is unable to decode the macro PDCCH because it is unable to receive the macro PDCCH from the eNB during the time for which it sends the PDCCH to the RN-UE. Accordingly, the eNB has to inform the RN of the index of a DM-RS, used in an R-PDCCH, via high-layer signaling.

An R-PDCCH includes only a limited number of bits, but has to be transmitted with high reliability. For this reason, the transmission rank of the R-PDCCH can be limited to a specific value. For example, the transmission rank of the R-PDCCH can be limited to 1. That is, an eNB may not use spatial multiplexing in the R-PDCCH transmitted by an RN.

In some cases, an eNB may not use spatial multiplexing while transmitting an R-PDCCH. The eNB can send a transmission rank value of the R-PDCCH to an RN via higher layer signal (e.g., an RRC message) so that the RN does not perform blind decoding for the R-PDCCH or blind detection for a transmission rank of the R-PDCCH. If an R-PDCCH transmission rank value is given, the RN can check the total number and locations of resource elements to which a DM-RS is allocated in the R-PDCCH region.

FIG. 12 shows an example in which an eNB sends the index of a DM-RS for an R-PDCCH and/or the transmission rank value of the R-PDCCH via high-layer signaling. In order to reduce such signaling overhead, the index of the DM-RS or a transmission rank value of the R-PDCCH may be previously fixed to a specific value.

The eNB can inform the index of the DM-RS, used in the R-PDSCH, through control information included in the R-PDCCH at step S200. Here, the amount of the control information included in the R-PDCCH can be reduced by setting up a specific relation between a set of DM-RSs used in the R-PDCCH and a set of DM-RSs used in the R-PDSCH.

For example, in relation to a primary backhaul region, the DM-RS used in the R-PDCCH can be used in the R-PDSCH likewise. In other words, in relation to the R-PDCCH and the R-PDSCH included in the primary backhaul regions, it can be previously defined that the DM-RS used in the R-PDCCH is always used in the R-PDSCH. That is, the set of DM-RSs used in the R-PDCCH can be represented as a subset of a set of DM-RSs used in the R-PDSCH.

The relation setup can be applied likewise even in a secondary backhaul region. That is, a set of DM-RSs used in an R-PDCCH included in a primary backhaul region is a subset of a set of DM-RSs used in an R-PDSCH included in the secondary backhaul region. In other words, the DM-RS used in the R-PDCCH included in the primary backhaul region is always used in the R-PDSCH included in the secondary backhaul region.

If the set of DM-RSs used in the R-PDSCH is determined as described above, control information signaling overhead for informing the set of DM-RSs used in the R-PDSCH can be reduced. This is because an eNB and an RN already know one DM-RS index used in an R-PDSCH (i.e., a DM-RS index used in an R-PDCCH) via high-layer signaling and the corresponding DM-RS index can be omitted in the control information of the R-PDCCH.

Further, the DM-RS provides a beamforming gain as compared with a CRS or a CSI-RS. For example, in case where a bitmap is used to indicate the DM-RS index for the R-PDSCH, the DM-RS index used in the R-PDCCH can be excluded from the bitmap. This is because the RN already knows that the DM-RS used in the R-PDCCH is used as the DM-RS for the R-PDSCH.

For another example, if a set of DM-RSs in which DM-RS indices are consecutive to each other is used for R-PDSCH transmission, it has only to inform only a transmission rank value of the R-PDSCH through an R-PDCCH. In this case, assuming that the index of a DM-RS used in the R-PDCCH is n, a DM-RS index used in the R-PDSCH can be n, n+1, . . . , n+k−1. Here, k is the transmission rank value of the R-PDSCH.

FIG. 13 is a diagram showing a relationship between the DM-RS index of an R-PDCCH and the DM-RS index of an R-PDSCH in case where a set of DM-RSs in which DM-RS indices are consecutive to each other is used to send R-PDSCHs.

In case where a DM-RS index value n of a DM-RS used in an R-PDCCH is informed via high-layer signaling and a transmission rank value k of an R-PDSCH is informed through control information of the R-PDCCH, the DM-RSs of the R-PDSCHs can have values of DM-RS indices n, n+1, . . . , n+k−1.

Referring back to FIG. 12, the RN decodes the R-PDCCHs at step S300. The RN can know an accurate set of the DM-RSs used in the R-PDSCHs by decoding the R-PDCCHs. Next, the eNB transmits R-PDSCHs at step S400, and the RN receives and decodes the R-PDSCHs at step S500. In FIG. 12, although it depicts an example in which the RN decodes the R-PDCCHs and the eNB then transmits the R-PDSCHs, the example is only for convenience of a description and the present invention is not limited thereto. In other words, the RN may receive all the R-PDCCHs and the R-PDSCHs and then decode the R-PDCCHs and the R-PDSCHs in this order or may perform the decoding of the R-PDCCHs and the reception of the R-PDSCHs at the same time.

2. Mapping of Resource Element Used in R-PDCCH and R-PDSCH

Hereinafter, a method of an eNB determining resource elements used in R-PDCCHs and R-PDSCHs is described.

FIG. 14 is a diagram showing an example of a Reference Signal (RS) resource element which can be allocated within a backhaul downlink subframe in a normal CP.

Referring to FIG. 14, the RS resource element is allocated to one subframe in the time domain and a region, including 12 subcarriers in the frequency domain (this is called a basic unit region, for convenience sake), with a specific pattern. For example, an RS resource element for a CRS can be allocated to the first, second, and fifth OFDM symbols of each slot with three subcarrier spacing. An RS resource element for a DM-RS (i.e DRS) (hereinafter referred to as a DM-RS resource element) can be allocated to the sixth and seventh OFDM symbols of each slot.

In order to transmit a DM-RS (i.e., DRS) up to a rank 2, 12 resource elements are used in the basic unit region. In order to transmit a DM-RS up to a rank 3 or more, 12 resource elements are further used in the basic unit region and thus a total of 24 resource elements are used. It is however to be noted that the number of resource elements used according to the rank is only illustrative, and a different number of resource elements may be used. That is, the number and pattern of DM-RS resource elements is determined according to the transmission rank of an R-PDSCH.

A conventional RN can know the transmission rank of an R-PDSCH after decoding an R-PDCCH. In other words, the RN does not know the transmission rank of the R-PDSCH until it decodes the R-PDCCH. Here, a problem is that the RN uses a DM-RS to decode the R-PDCCH and the number of DM-RS resource elements can be changed according to the transmission rank of the R-PDSCH.

For example, in case where 4 OFDM symbols are used for an R-PDCCH as in FIG. 14, an RN is unable to know whether the number of DM-RS resource elements within a basic unit region is 12 or 24 and unable to know DM-RS resource elements included in the 4 OFDM symbols. Accordingly, the RN has to decode the R-PDCCH through blind decoding. That is, the RN decodes the R-PDCCH in such a way as to perform decoding for all possible resource element combinations in the 4 OFDM symbols. This results in excessive overhead to the receiver of the RN.

In order to solve the problem, an eNB can restrict an R-PDCCH resource element to a resource element not overlapping with all resource elements which can be used to send a DM-RS (this is called a DM-RS candidate resource element). That is, the eNB can puncture all DM-RS candidate resource elements to which the DM-RS can be allocated in the R-PDCCH region, map control information transmitted through the R-PDCCH to the remaining resource elements, and transmit the control information. Here, the resource elements of all candidate locations to which a CSI-RS can be allocated may be excluded additionally. The CSI-RS can be known through system information, and the RN can previously know that the CSI-RS is transmitted through which resource element. The RN can decode the R-PDCCH on the assumption that the DM-RS resource elements have a pattern according to a maximum transmission rank value of the R-PDSCH.

Meanwhile, the resource elements of the R-PDSCH can include resource elements which are not actually used to transmit the DM-RS, among the DM-RS candidate resource elements. The RN can know the transmission rank of the R-PDSCH by decoding the R-PDCCH and thus know whether the DM-RS has actually been mapped to which resource element in the R-PDSCH region. Accordingly, the RN can accurately decode the R-PDSCH.

FIG. 15 is a diagram showing an example of a DM-RS resource element which is assumed by an RN in the R-PDCCH region of a backhaul downlink subframe.

Referring to FIG. 15, the RN assumes DM-RS resource elements arranged in case where an R-PDSCH is transmitted with a maximum transmission rank value of backhaul downlink and performs R-PDCCH decoding. That is, it is assumed that DM-RS resource elements within an R-PDCCH region are arranged in case where R-PDSCH transmission is a rank 3 or more.

An RN can know the rank value of actual R-PDSCH transmission by decoding R-PDCCHs. Accordingly, the RN has only to decode an R-PDSCH region by taking DM-RS resource elements according to the rank value of R-PDSCH transmission into consideration. FIG. 15 is an exemplary diagram showing a case in which R-PDSCH transmission is rank 1 or rank 2 transmission.

FIG. 16 is a diagram showing an example of the DM-RS resource element of a backhaul downlink subframe.

As shown in FIG. 16, an eNB can assume a DM-RS for a maximum transmission rank value irrespective of an actual transmission rank of an R-PDSCH value and allocate R-PDCCHs and R-PDSCHs to resource elements to which the DM-RS has not been allocated. An RN can assume a DM-RS for a maximum transmission rank value of an R-PDSCH and perform R-PDCCH and R-PDSCH decoding for resource elements not overlapping with resource elements to which the DM-RS can be allocated. That is, the eNB can maintain the structure of a DM-RS in each slot of a backhaul downlink subframe in the same manner. Accordingly, an increase of complexity can be prevented and convenience of implementations can be increased.

3. Precoding Matrix and Vector Applied to R-PDCCH and R-PDSCH

FIG. 17 is a diagram showing an example of a transmitter structure according to an embodiment of the present invention.

Referring to FIG. 17, a transmitter includes an MIMO processor 171, a reference signal generator 173, and a precoder 172. The transmitter can be part of an eNB.

The MIMO processor 171 generates control information and data which will be transmitted to an RN. The MIMO processor 171 generates the control information and data in the form of R information streams IS (i.e., IS#1 to IS#R). In this case, R denotes the number of spatial layers.

The precoder 172 receives spatial streams SS from the MIMO processor 171 and generates transmit streams (TS) (i.e., TS#1 to TS#$N_T$), such as the number of transmission antennas ($N_T$), by applying a precoding matrix or a precoding vector to the spatial streams.

The reference signal generator 173 generates a reference signal sequence and provides it to the input or output of the precoder 172. A DRS used as the above-described DM-RS is provided to the input of the precoder 172, predecoded by the precoder 172, included in the transmit streams, and then output. That is, the DRS becomes a precoded reference signal. The CRS is added to the output of the precoder 173 and included in the transmit streams.

In case where the DRS is used for an R-PDCCH and an R-PDSCH, a precoding matrix for the two channels (i.e., the R-PDCCH and the R-PDSCH) is required in order to support the precoded reference signal. In this case, the eNB can configure a precoding matrix/vector for the R-PDCCH as a subset of a precoding matrix/vector used for the R-PDSCH.

For example, a precoding matrix W used in the R-PDSCH can be represented by the following equation 12.

$$W = (w_0 \ w_1 \ \ldots \ w_{R-1}) = \begin{pmatrix} w_{01} & w_{11} & \ldots & w_{(R-1)1} \\ w_{02} & w_{12} & \ldots & w_{(R-1)2} \\ \vdots & \vdots & \ddots & \vdots \\ w_{0Nt} & w_{1Nt} & \ldots & w_{(R-1)Nt} \end{pmatrix}$$ [Equation 12]

Here, $w_i$ denotes an $i^{th}$ column vector of the precoding matrix W (where i=0, . . . , R−1). If the rank of the R-PDSCH is 3, the precoding matrix W can be represented by ($w_0$, $w_1$, $w_2$). Here, if the rank of the R-PDCCH is 1, any one column vector in the rank 3 precoding matrix of the R-PDSCH can be selected as a precoding vector for the R-PDCCH. That is, any one of $w_0$, $w_1$, and $w_2$ can be selected.

If the transmission rank of the R-PDCCH is given X, a precoding vector can be selected in various ways. For example, the first X number of column vectors or the last X number of column vectors may be selected in the precoding matrix applied to the R-PDSCH. In some cases, a certain X number of column vectors may be selected in the precoding matrix through explicit signaling.

The above-described method means that a precoding vector/matrix used in an R-PDCCH is a subset of a precoding matrix/vector used in an R-PDSCH and that a DRS (i.e., a DM-RS) transmission antenna port (or a layer) is used in both the R-PDCCH and the R-PDSCH. That is, in the R-PDCCH and the R-PDSCH, resource elements are exclusively multiplexed (it means that the R-PDCCH and the R-PDSCH are allocated to different resource elements) in the time and frequency domains, but are not spatially exclusive.

Meanwhile, another method of taking that DM-RS resource elements are arranged in both slots on the basis of the slot of a subframe in the same manner and R-PDCCH resource elements to which R-PDCCHs are mapped exit only in the first slot in order to prevent decoding delay into consideration may be used. That is, the DM-RS resource elements of the first slot are used to demodulate the R-PDCCHs, and the DM-RS resource elements of the second slot are used to demodulate the R-PDSCHs. In this case, a different precoding matrix can be applied to a DM-RS according to a channel type (i.e., the R-PDCCH or the R-PDSCH). In order to support the above method, an eNB can semi-statically signal the index of a DM-RS, used in the R-PDCCH, via high-layer signaling and signal the index of a DM-RS, used in the R-PDSCH, in a corresponding R-PDCCH. If DM-RS resource elements of different slots are used when the R-PDCCH and the R-PDSCH are demodulated, there is no overlapping portion when two DM-RSs are used although the R-PDCCH and the R-PDSCH are demodulated using the same DM-RS index. Accordingly, DM-RS resource elements for demodulating the R-PDCCH can be known irrespective of the rank of the R-PDSCH. The RN does not need to perform blind decoding in order to distinguish the R-PDCCH resource element and the DM-RS resource element.

In some cases, the R-PDCCH can be transmitted using one dedicated DM-RS transmission antenna port which is not used in the R-PDSCH (In case where a transmission diversity is applied to the R-PDCCH, the R-PDCCH can be transmitted using two DM-RS transmission antenna ports). In this method, the R-PDCCH and the R-PDSCH are exclusively spatially multiplexed. Here, the R-PDCCH can be transmitted using a Cyclic Delay Diversity (CDD) scheme or a transmit diversity scheme (e.g., Space-Time Block Coding (STBC), Space-Frequency Block Coding (SFBC), or a combination of STBC and SFBC).

In some cases, an eNB can transmit a CRS in a subframe in which R-PDCCHs are transmitted, and an RN can demodulate the R-PDCCHs using the CRS and demodulate R-PDSCHs using a DM-RS. In general, the CRS is transmitted over the entire system band and transmitted over all subframes. In an LTE-A subframe (e.g., an MBSFN subframe or a fake MBSFN subframe), an eNB transmits a CRS only in the first predetermined number of OFDM symbols. Here, the MBSFN subframe or the fake MBSFN subframe has the same structure as an MBSFN subframe for MBMS, but is not a subframe used for the MBMS. That is, the MBSFN subframe or the fake MBSFN subframe is a subframe used by an eNB in order to transmit a backhaul signal to an RN. The eNB provides an Ma-UE with information, indicating that the MBSFN subframe or the fake MBSFN subframe is a subframe for which the reception and measurement of a signal is unnecessary.

In such an LTE-A subframe, an RN can demodulate an R-PDCCH on the assumption that a CRS is located only in a resource block in which the R-PDCCH is transmitted (Here, an R-PDSCH can also be included in the resource block). When the eNB informs the RN of the LTE-A subframe, the RN can demodulate the R-PDCCH using the CRS which is transmitted over the entire system band in accordance with the above-described method. The eNB can transmit the R-PDCCH using a transmit diversity scheme, such as SFBC, and the RN can demodulate the R-PDCCH on the assumption that the only CRS exists in the resource block in which the R-PDCCH is transmitted. Further, the R-PDSCH can be demodulated using a DM-RS. If resources used in backhaul transmission are spatially multiplexed with resources used for transmission to an Ma-UE (i.e., a multi-user MIMO is used between a UE and an RN), the spatially multiplexed UE has to be informed that the CRS exists in the subframe for multi-user MIMO transmission.

The eNB can transmit the R-PDCCH using the same antenna port as an antenna port in which the CRS is transmitted. Meanwhile, the eNB can transmit the R-PDSCH using the same antenna port as an antenna port in which the DM-RS is transmitted. According to the above method, the eNB can transmit the R-PDCCH using the CRS in accordance with a transmit diversity scheme or a spatial multiplexing scheme. At the same time, the R-PDSCH, unlike the R-PDCCH, can be precoded or subjected to subband precoding.

It can be difficult to puncture all resource elements in which the DM-RS can be transmitted in the R-PDCCH region according to circumstances. This is because reference signal overhead is excessively increased. In such a case, in an OFDM symbol period in which the R-PDCCH is transmitted, only a DM-RS reference signal for a specific layer can be mapped. In this case, a specific layer can be a layer up to a specific rank in which the R-PDCCH can be transmitted.

FIG. 18 is a diagram showing an example in which an eNB maps DM-RS resource elements to R-PDCCH regions and R-PDSCH regions according to their ranks.

For example, in case where the transmission rank of an R-PDSCH is 3 or more and the transmission rank of an R-PDCCH is limited to 2, only DM-RS (or DRS) resource elements for a layer 1 and 2 are mapped in an OFDM symbol period in which the R-PDCCH is transmitted. On the other hand, both DM-RS resource elements for layers 1 and 2 and a DM-RS resource element for a layer 3 or more are mapped in the R-PDSCH region. That is, DM-RSs up to the transmission rank 2 are used in both the R-PDCCH region and the R-PDSCH region, and DM-RSs of the rank 3 or more are used in only the R-PDSCH region. A resource element for a CSI-RS can be placed in the same symbol as a symbol in which the DM-RS is disposed because it does not have a symbol which is dedicated to a resource element used by the CSI-RS. This is useful for an extended CP.

An eNB can map the R-PDCCH to an N number of OFDM symbol periods, not including the DM-RS, in order to prevent the R-PDCCH from being mapped to a resource element to which the DM-RS can be mapped. This method can increase the detection and decoding speed of the R-PDCCH and also the detection and decoding speed of the R-PDSCH. Here, N can be set by high-layer signaling or may be a predifined specific value.

In case where a CSI-RS is mapped within an OFDM symbol period to which an R-PDCCH is mapped, the mapping of the R-PDCCH can be changed according to whether the CSI-RS is mapped. Accordingly, the R-PDCCH may not be mapped to an OFDM symbol to which the CSI-RS is mapped. In some cases, an R-PDCCH can be mapped to resource elements other than a resource element to which the CSI-RS is mapped. The second method can be performed without additional receiver detection and decoding complexity. This is because an RN can know whether the CSI-RS exists within the R-PDCCH region through system information.

An eNB can transmit information about the type of a backhaul subframe, allocated to a backhaul link, to an RN. The RN can distinguish and demodulate resource elements to which an R-PDCCH is mapped on the basis of the type of the backhaul subframe.

In case where an eNB configures a backhaul subframe through which an R-PDCCH or an R-PDSCH is received by an RN as an MBSFN subframe or a fake MBSFN subframe (hereinafter referred to as an MBSFN subframe), the eNB does not transmit a CRS in OFDM symbols other than the first and second OFDM symbols of the backhaul subframe. This means that the mapping of R-PDCCH resource elements can be changed according to whether the eNB sets the backhaul subframe as the MBSFN subframe. This is because into which OFDM symbol period the CRS resource element is inserted is changed in the backhaul subframe.

If the eNB can inform the RN that a specific backhaul subframe is the MBSFN subframe and thus the RN can previously know the presence of the CRS, the eNB can map the R-PDCCH to resource elements that are not used for the CRS transmission. More particularly, the eNB does not map the R-PDCCH to the CRS resource element in a subframe where the CRS exist, but, in a subframe where the CRS does not exist (e.g., an MBSFN subframe), the eNB can map the R-PDCCH to even a resource element in which the CRS can be disposed.

In case where the RN is not informed of information about the type of a backhaul subframe, the eNB maps the R-PDCCH to resource elements other than resource elements to which the CRS can be allocated irrespective of whether the CRS can be actually transmitted. That is, if the RN is unable to previously know whether a specific backhaul subframe is an MBSFN subframe, the R-PDCCH is mapped to a resource element not a resource element to which the CRS can be allocated and then transmitted.

FIG. 19 is a diagram showing an example in which a plurality of R-PDCCHs is transmitted through different spatial layers in case where the plurality of R-PDCCHs is multiplexed within one resource block in the frequency domain.

An R-PDSCH and an R-PDCCH can be separated from each other and multiplexed in the frequency domain. This corresponds to, for example, a case in which the resource element of the R-PDCCH and the resource element of the R-PDSCH are not multiplexed within one resource block (i.e., 12 subcarriers) in the frequency domain, but included in different resource blocks. In this case, one resource block can include more resource elements than resource elements which are necessary for an eNB to reliably transmit R-PDCCHs to an RN. In such a case, a plurality of R-PDCCHs transmitted to different RNs can be multiplexed within the same resource block. If the eNB uses a precoded DM-RS when transmitting the plurality of R-PDCCHs, it may be difficult to find a precoding vector which provides a good Signal to Interference plus Noise Ratio (SINR) to the RNs spaced apart from each other.

For this reason, the eNB can perform orthogonal spatial layer transmission between the plurality of RNs. For example, in case where two R-PDCCHs (e.g., an R-PDCCH for RN#1 and an R-PDCCH for RN#2) are multiplexed in one resource block, the R-PDCCHs can be transmitted in different slots.

At the same time, each R-PDCCH can be transmitted in different DM-RS antenna ports. This substantially has the same meaning that different R-PDCCHs are mapped to resource elements having different time and frequency within one resource block. In order to apply different precoding to each of the R-PDCCHs, the eNB transmits the R-PDCCHs through different DM-RS antenna ports. In this case, the R-PDCCHs transmitted to respective RNs are transmitted in different spatial layers, and DM-RSs for the respective R-PDCCHs are transmitted in the resource elements of the same time and frequency domain and multiplexed in the code domain using orthogonal codes. In accordance with the above method, it can prevent the number of R-PDCCH resource elements from being changed according to whether a plurality of R-PDCCHs is included within one resource block.

In case where R-PDCCHs and R-PDSCHs are transmitted within a Physical Resource Block (PRB) pair, the number of transmission layers of the R-PDCCHs can differ from the number of transmission layers of the R-PDSCHs (refer to FIG. 13). In this case, the R-PDCCH can be transmitted such that a set of REs is precoded by a linear combination of the precoding vectors of the R-PDSCH layers and another set of REs is precoded by another linear combination of the precoding vectors.

For example, it is assumed that the R-PDCCH has one transmission layer and the R-PDSCH has a K number of transmission layers. Here, a k layer (where k is any one of 0, 1, . . . , K-1) of the R-PDSCH is mapped to a DM-RS antenna port $n_0, n_1, \ldots, n_{k-1}$. In this case, it is assumed that a precoding vector $v_m=[v_{m,0}\ v_{m,1}\ \ldots\ v_{m,P-1}]$ (where P is the number of transmission antenna ports) is commonly applied to the R-PDSCH layer m and the DM-RS antenna port $n_m$.

In this case, resource elements used for R-PDCCH transmission can be grouped by G group (i.e., R-PDCCH resource element group). It is preferred that the resource element grouping be performed so that resource elements contiguous in the time and frequency domains are not included in the same group (In this case, a grouping configuration can be previously determined or signaled to an RN). A resource element group g (where g is any one natural number of 1 to G) has its own combination weight $a_g=[a_{g,0}\ a_{g,1}\ \ldots\ a_{g,\ k-1}]$. The combination weight can be previously determined or signaled to an RN.

When transmitting the R-PDCCH, an eNB precodes a signal, mapped to the resource elements of the resource element group g, using a precoding vector $a_{g,0}*v_0+a_{g,1}*v_1+ \ldots +a_{g,\ k-1}*v_{k-1}$. That is, the eNB precodes the signal into a linear combination vector in which the combination weight of the resource element group g has been applied to the precoding vectors of R-PDSCHs. In other words, R-PDCCH resource element sets are precoded into respective linear combinations vectors in which their own combination weights have been applied to the R-PDSCH precoding vectors. If the above method is used, a higher spatial diversity gain can be acquired when the eNB transmits the R-PDCCH.

In the above example, the RN can demodulate the R-PDCCH through the following procedure.

1. Estimate an effective channel (i.e., a channel multiplied by a precoding vector) of each R-PDSCH transmission layer.

2. Find an effective channel of each R-PDCCH resource element group by applying a combination weight of each R-PDCCH resource element group.

3. Demodulate the R-PDCCH resource elements from the effective channels of the corresponding R-PDCCH resource element group.

A combination weight for all the R-PDCCH resource elements may be, for example, [1 0 . . . 0]. This means that the precoding vector of an R-PDSCH transmission layer 0 (i.e., the DM-RS antenna port of the R-PDSCH transmission layer 0) is used for the R-PDCCH.

For another example, g=k, and $a_0=[1\ 0\ \ldots\ 0]$, $a_1=[0\ 1\ 0\ldots 0], \ldots, a_g=[0\ldots 0\ 1]$. In this case, the precoding vector (and the DM-RS antenna port) of the R-PDSCH transmission layer g is used for the R-PDCCH resource element group g. This means that the precoding vector and the DM-RS antenna port of each R-PDSCH transmission layer are applied to the R-PDCCH. In an alternative, in case where g is a predetermined value or a specific value signaled to an RN, $a_0=[1\ 0\ \ldots\ 0]$, $a_1=[0\ 1\ 0\ \ldots\ 0], \ldots, a_g=[0\ \ldots\ 0\ 1]$ can be used.

For yet another example, a circular shift of a specific common vector can be used as the combination weight of each resource element group (i.e., an R-PDCCH resource element group). For example, a Discrete Fourier Transform (DFT) sequence $a_g[\exp(0*j2\pi g/k)\ \exp(1*j2\pi*g/k)\ \ldots\ \exp((k-1)*j2\pi g/k)]$ can be used as the combination weight of a resource element group. If the number of R-PDSCH transmission layers is 2 and the number of R-PDCCH resource element groups is 2, $a_0[1\ 1]$, $a_1=[1-1]$ can be used. This means that $(v_0+v_1)$ is applied to a resource element group 0 and $(v_0-v_1)$ is applied to a resource element group 1. In an alternative, a DFT sequence $a_g[\exp(0*j2\pi g/L)\ \exp(1*j2\pi*g/L)\ \ldots\ \exp((L-1)*j2\pi g/L)]$ can be used as the combination weight of the resource element group. Here, L can be a predetermined value or a value signaled to an RN.

The above-described method (i.e., the method using a combination of one or more R-PDSCH DM-RS sequences as the R-PDCCH DM-RS sequence) can also be applied to a case in which a plurality of R-PDCCHs (or some of a plurality of R-PDCCHs) is transmitted in one PRB pair.

For example, it is assumed that different L numbers of R-PDCCHs are transmitted in one PRB pair (where L can be a predetermined value or a value signaled to an RN). It is also assumed that a k number of DM-RS antenna ports are used for the L numbers of R-PDCCHs (where k can be a predetermined value or a value signaled to an RN). In this case, signals transmitted by different R-PDCCHs are mapped to different resource elements. That is, the signals are mapped to orthogonal time and frequency resources. Further, resource elements used for R-PDCCH transmission are grouped like in the above-described method. The resource element group g has a combination weight $a_g$, and R-PDCCH signals transmitted in the resource element group g can be precoded using a precoding vector $a_{g,0}*v_0+a_{g,1}*v_1+ \ldots +a_{g,\ k-1}*v_{k-1}$.

For example, it is assumed that L=2, k=2, $a_0=[1\ 1]$, and $a_1=[1-1]$. It is also assumed that even-numbered resource elements (e.g., resource elements 0, 2, 4, . . . ,) from among the resource elements of a PRB pair are included in a resource element group 0 and odd-numbered resource elements (e.g., resource elements 1, 3, 5, . . . ,) from among the resource elements of the PRB pair are included in a resource element group 1. In this case, two R-PDCCHs can be transmitted as follows.

1. The resource element 0 is used in an R-PDCCH 0, and a precoding vector $(v_0+v_1)$ can be used. 2. The resource element 1 is used in an R-PDCCH 0, and a precoding vector $(v_0-v_1)$ can be used. 3. The resource element 2 is used in an R-PDCCH 1, and a precoding vector $(v_0+v_1)$ can be used. 4. The resource element 3 is used in an R-PDCCH 1, and a precoding vector $(v_0-v_1)$ can be used. The allocation method of the resource elements 1 to 4 is repeated for all the resource elements of the PRB pair.

In case where an R-PDCCH is demodulated using a DM-RS in order to support an efficient multi-user MIMO in backhaul resources, an eNB can indicate the antenna port of a DM-RS of an R-PDCCH for each RN. In an alternative, the eNB can indicate the scramble ID of a DM-RS antenna port 0 of an R-PDCCH transmitted to each RN. In an alternative, the eNB can indicate a combination of the DM-RS antenna port and the scramble ID of an R-PDCCH transmitted to each RN. The scramble ID of the DM-RS antenna port is for a DM-RS antenna port different from a DM-RS antenna port which is used to schedule other multi-user MIMO resources in the spatial domain. The above-described DM-RS index can be given as the DM-RS antenna port, the scramble ID, or a combination thereof.

R-PDCCH transmission of an eNB to an RN may be performed using a DM-RS antenna port that is not previously configured. This means that an RN performs blind detection for the R-PDCCH using a DM-RS antenna port (or a scramble ID or both) which is not previously known in potential R-PDCCH resources. In accordance with the above method, the eNB can dynamically perform multi-user MIMO transmission for RN resources without previously transmitting information about the DM-RS antenna port (or the scramble ID or both) of the R-PDCCH and an R-PDSCH to an RN.

In case where an RN performs blind detection for an R-PDCCH, to limit a DM-RS antenna port used for R-PDCCH transmission can be useful. For example, in order to demodulate the R-PDCCH, limits can be set so that only a DM-RS antenna port 0 or a DM-RS antenna port 1 is used. In this example, two antenna ports can be configured to share the same resource elements and divided into code domain (CDM), thereby minimizing reference signal overhead.

In an alternative, in order to demodulate the R-PDCCH, restrictions can be placed so that only DM-RS antenna ports 0 and 2 are used. The above method is advantageous in that the transmission rank of an R-PDSCH for each RN can be easily extended up to 2 in a multi-user MIMO. An RN can demodulate its own R-PDCCH using the DM-RS antenna port 0 and at the same time demodulate an R-PDSCH, received through a transmission rank 2, using the DM-RS antenna ports 0 and 2. An RN which demodulates its own R-PDCCH through the DM-RS antenna port 2 can receive an R-PDSCH (i.e., a transmission rank 2) and demodulate the received R-PDSCH using the DM-RS antenna ports 2 and 3. For such an operation, the RN performs demodulation on the assumption that an R-PDCCH signal has been mapped with a maximum DM-RS overhead (e.g., it is assumed that 24 resource elements have been mapped within a basic unit region). However, if the entire transmission rank is equal to or smaller than 2, actual DM-RS overhead can be smaller (In case where 12 resource elements are mapped within a basic unit region). Consequently, a first slot in which an R-PDCCH is transmitted can have greater DM-RS overhead than a second slot in which an R-PDSCH is transmitted.

FIG. 20 is a block diagram showing an eNB and an RN.

The eNB 100 includes a processor 110, memory 120, and a Radio Frequency (RF) unit 130. The processor 110 implements the proposed functions, processes, and/or methods. That is, the processor 110 transmits information about a DRS which is used to demodulate R-PDCCHs to an RN via high-layer signaling and transmits information about a DRS for an R-PDSCH in the R-PDCCH. The memory 120 is connected to the processor 110 and configured to store various pieces of information for driving the processor 110. The RF unit 130 is connected to the processor 110 and configured to send or receive or both a radio signal.

The RN 200 includes a processor 210, memory 220, and an RF unit 230. The processor 210 receives information about a DRS which is used to demodulate a control channel via high-layer signaling, such as an RRC message, from an eNB, receives control information and data through R-PDCCHs and R-PDSCHs, and demodulate the control information and data. Here, the control information is demodulated using a DRS indicated by high-layer signaling, and the data are demodulated using a DRS indicated by control information included in an R-PDCCH. The layers of a radio interface protocol can be implemented by the processor 210. The memory 220 is connected to the processor 210 and configured to store various pieces of information for driving the processor 210. The RF unit 230 is connected to the processor 210 and configured to send or receive or both a radio signal.

The processor 110, 210 can include an Application-Specific Integrated Circuit (ASIC), other chipset, a logic circuit, a data processor and/or a converter for mutually converting a baseband signal and a radio signal. The memory 120, 220 can include Read-Only Memory (ROM), Random Access Memory (RAM), flash memory, a memory card, a storage medium and/or other storage devices. The RF unit 130, 230 can include one or more antennas for sending or receiving or both a radio signal. When the embodiments are implemented in software, the above schemes can be implemented by a module (or a process or a function) to perform the above functions. The module can be stored in the memory 120, 220 and executed by the processor 110, 210. The memory 120, 220 can be disposed inside or outside the processor 110, 210 and connected to the processor 110, 210 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal, performed by an evolved NodeB (eNB), the method comprising:
   transmitting, to a relay node, control information through a control channel;
   transmitting, to the relay node, data corresponding to the control information through a data channel; and
   transmitting, to the relay node, user equipment (UE)-specific reference signals to be used for demodulating the control information and the data,
   wherein when a number of layers used for transmission of the data is equal to or more than 2, UE-specific reference signals to be used for demodulating the control information are transmitted on only one fixed antenna port n and UE-specific reference signals to be used for demodulating the data are transmitted on antenna ports n, . . . , (n+k−1),
   where n is a natural number and k is the number of layers used for transmission of the data.

2. The method of claim 1, wherein resource allocating information scheduling the data is transmitted through the control information.

3. The method of claim 1, wherein the control channel and the data channel are transmitted at different times in a same subframe.

4. The method of claim 1, wherein the control channel is transmitted in at least one orthogonal frequency division multiplexing (OFDM) symbol which is placed after OFDM symbols used by the eNB in order to transmit the control channel to the UE.

5. An evolved NodeB (eNB) comprising:
   a radio frequency (RF) transceiver configured to transmit and receive a radio signal; and
   a processor connected to the RF transceiver and configured to:
      transmit, to a relay node, control information through a control channel,
      transmit, to the relay node, data corresponding to the control information through a data channel, and
      transmit, to the relay node, user equipment (UE)-specific reference signals to be used for demodulating the control information and the data,
   wherein when a number of layers used for transmission of the data is equal to or more than 2, UE-specific reference signals to be used for demodulating the control information are transmitted on only one fixed antenna port n and UE-specific reference signals to be used for demodulating the data are transmitted on antenna ports n, . . . , (n+k−1), where n is a natural number and k is the number of layers used for transmission of the data.

6. The eNB of claim 5, wherein resource allocating information scheduling the data is transmitted through the control information.

7. The eNB of claim 5, wherein the control channel and the data channel are transmitted at different times in a same subframe.

8. The eNB of claim 5, wherein the control channel is transmitted in at least one orthogonal frequency division multiplexing (OFDM) symbol which is placed after OFDM symbols used by the eNB in order to transmit the control channel to the UE.

* * * * *